(12) United States Patent
Parupudi et al.

(10) Patent No.: US 6,944,679 B2
(45) Date of Patent: Sep. 13, 2005

(54) CONTEXT-AWARE SYSTEMS AND METHODS, LOCATION-AWARE SYSTEMS AND METHODS, CONTEXT-AWARE VEHICLES AND METHODS OF OPERATING THE SAME, AND LOCATION-AWARE VEHICLES AND METHODS OF OPERATING THE SAME

(75) Inventors: Gopal Parupudi, Issaquah, WA (US); Stephen S. Evans, Redmond, WA (US); Edward F. Reus, Woodinville, WA (US)

(73) Assignee: Microsoft Corp., Redmond, WA (US)

( * ) Notice: Subject to any disclaimer, the term of this patent is extended or adjusted under 35 U.S.C. 154(b) by 1045 days.

(21) Appl. No.: 09/746,923

(22) Filed: Dec. 22, 2000

(65) Prior Publication Data

US 2002/0120370 A1 Aug. 29, 2002

(51) Int. Cl.[7] ............................................. G06F 15/16
(52) U.S. Cl. ........................................ 709/246; 701/24
(58) Field of Search ................................. 709/246, 203; 718/108; 701/24, 207

(56) References Cited

U.S. PATENT DOCUMENTS

| | | | |
|---|---|---|---|
| 4,845,744 A | 7/1989 | DeBenedictis |
| 5,224,100 A | 6/1993 | Lee et al. |
| 5,224,150 A | 6/1993 | Neustein |
| 5,230,048 A | 7/1993 | Moy |
| 5,230,072 A | 7/1993 | Smith et al. |
| 5,295,261 A | 3/1994 | Simonetti |
| 5,319,775 A | 6/1994 | Loges et al. |
| 5,321,815 A | 6/1994 | Bartolanzo, Jr. et al. |
| 5,479,476 A | 12/1995 | Finke-Anlauff |
| 5,499,032 A | 3/1996 | Kelley et al. |
| 5,539,922 A | 7/1996 | Wang |
| 5,611,050 A | 3/1997 | Theimer et al. |
| 5,635,940 A | 6/1997 | Hickman et al. |
| 5,644,740 A | 7/1997 | Kiuchi |
| 5,717,387 A | * 2/1998 | Suman et al. ................ 701/36 |
| 5,752,243 A | 5/1998 | Reiter et al. |
| 5,774,540 A | 6/1998 | Davidson et al. |

(Continued)

FOREIGN PATENT DOCUMENTS

| | | |
|---|---|---|
| EP | 0817444 | 1/1998 |
| WO | WO 99/55102 | 10/1999 |
| WO | WO 99/65207 | 12/1999 |

OTHER PUBLICATIONS

Dan Chalmers, Morris Sloman., "QoS and Context Awareness for Mobile Computing," Handheld and Ubiquitous Computing First International Symposium, HUC'99, Karlsruhe, Germany, Sep. 27–29, 1999 Proceedings, pp. 380–382.

(Continued)

*Primary Examiner*—Bunjob Jaroenchonwanit
(74) *Attorney, Agent, or Firm*—Lee & Hayes PLLC

(57) ABSTRACT

Context-aware systems and methods, location-aware systems and methods, context-aware vehicles and methods of operating the same, and location-aware vehicles and methods of operating the same are described. In various embodiments, a context or location service module, implemented in software, determines a vehicle context or a vehicle location based upon information that it receives from various context providers or location providers respectively. Software executing on a vehicle's computer can then cause one or more applications that are associated with a vehicle computer to be modified in a manner that changes their behavior. The behavior modification is based on the current context or location of the vehicle and thus provides a context-specific or location-specific user experience. The context or location can be ascertained through the use of one or more hierarchical tree structures that comprises individual nodes. Each node is associated with a context or location. The nodes are traversable by the vehicle's software to ascertain a more complete context or location.

3 Claims, 18 Drawing Sheets

U.S. PATENT DOCUMENTS

| | | |
|---|---|---|
| 5,794,142 A | 8/1998 | Vanttila et al. |
| 5,806,017 A | 9/1998 | Hancock |
| 5,870,751 A | 2/1999 | Trotter |
| 5,917,911 A | 6/1999 | Dabbish et al. |
| 5,937,164 A | 8/1999 | Mages et al. |
| 5,945,985 A | 8/1999 | Babin et al. |
| 5,948,040 A | 9/1999 | DeLorme et al. |
| 5,953,722 A | 9/1999 | Lampert et al. |
| 5,991,756 A | 11/1999 | Wu |
| 6,018,570 A | 1/2000 | Matison |
| 6,028,551 A | 2/2000 | Schoen et al. |
| 6,054,989 A | 4/2000 | Robertson et al. |
| 6,057,845 A | 5/2000 | Dupouy |
| 6,078,826 A | 6/2000 | Croft et al. |
| 6,088,717 A | 7/2000 | Reed et al. |
| 6,091,956 A | 7/2000 | Hollenberg |
| 6,104,344 A | 8/2000 | Wax et al. |
| 6,125,446 A | 9/2000 | Olarig et al. |
| 6,127,947 A * | 10/2000 | Uchida et al. ............... 340/999 |
| 6,128,759 A | 10/2000 | Hansen |
| 6,151,601 A | 11/2000 | Papierniak et al. |
| 6,160,553 A | 12/2000 | Robertson et al. |
| 6,166,738 A | 12/2000 | Robertson et al. |
| 6,185,569 B1 | 2/2001 | East et al. |
| 6,188,405 B1 | 2/2001 | Czerwinski et al. |
| 6,201,973 B1 | 3/2001 | Kowaguchi |
| 6,216,087 B1 | 4/2001 | Want et al. |
| 6,233,448 B1 | 5/2001 | Alperovich et al. |
| 6,243,093 B1 | 6/2001 | Czerwinski et al. |
| 6,279,007 B1 | 8/2001 | Uppala |
| 6,281,896 B1 | 8/2001 | Alimpich et al. |
| 6,292,833 B1 | 9/2001 | Liao et al. |
| 6,300,936 B1 | 10/2001 | Braun et al. |
| 6,307,573 B1 | 10/2001 | Barros |
| 6,313,791 B1 | 11/2001 | Klanke |
| 6,327,535 B1 | 12/2001 | Evans et al. |
| 6,343,291 B1 | 1/2002 | Goldman |
| 6,359,892 B1 | 3/2002 | Szlam |
| 6,374,177 B1 * | 4/2002 | Lee et al. ................... 701/200 |
| 6,389,288 B1 | 5/2002 | Kuwahara et al. |
| 6,401,051 B1 | 6/2002 | Merriam |
| 6,405,020 B1 * | 6/2002 | Oestreich et al. ......... 455/67.13 |
| 6,411,220 B1 * | 6/2002 | Davis et al. ................ 340/905 |
| 6,411,899 B2 | 6/2002 | Dussell et al. |
| 6,418,533 B2 | 7/2002 | Angelo et al. |
| 6,421,072 B1 | 7/2002 | Ku et al. |
| 6,421,544 B1 | 7/2002 | Sawada |
| 6,421,716 B1 | 7/2002 | Eldridge et al. |
| 6,442,620 B1 | 8/2002 | Thatte et al. |
| 6,470,344 B1 | 10/2002 | Kothuri et al. |
| 6,513,059 B1 | 1/2003 | Gupta et al. |
| 6,522,875 B1 | 2/2003 | Dowling et al. |
| 6,553,310 B1 | 4/2003 | Lopke |
| 6,581,062 B1 | 6/2003 | Draper et al. |
| 6,625,615 B2 | 9/2003 | Shi et al. |
| 6,628,928 B1 * | 9/2003 | Crosby et al. ................ 455/77 |
| 6,750,883 B1 | 6/2004 | Parupudi et al. |
| 6,823,354 B1 * | 11/2004 | Kynast et al. .............. 709/200 |
| 2002/0029291 A1 * | 3/2002 | Crandall ..................... 709/246 |
| 2002/0081984 A1 * | 6/2002 | Liu ......................... 455/186.1 |
| 2002/0111715 A1 * | 8/2002 | Richard ........................ 701/1 |
| 2002/0119788 A1 | 8/2002 | Parupudi et al. |
| 2002/0120370 A1 | 8/2002 | Parupudi et al. |
| 2002/0122055 A1 | 9/2002 | Parupudi et al. |
| 2002/0156870 A1 * | 10/2002 | Boroumand et al. ........ 709/219 |

OTHER PUBLICATIONS

Gregory D. Abowd,, "Software Design Issues for Ubiquitous Computing," 1998 IEEE, pp. 104–109.

Bill Schilit, Norman Adams, Roy Want, "Context–Aware Computing Applications," 1995 IEEE, pp. 85–90.

Hansson, H.A. et al., "Basement: A Distributed Real–Time Architecture for Vehicle Applications" Proceedings of Real–Time Technology and Applications Symposium, May 15–17, 1995 pp 220–229.

Yasuto Nakanishi et al., "Context Aware Messaging Service: A Dynamic Messaging Delivery Using Location Information and Schedule Information," Personal Technologies (2000) 4:221–224.

Jason Pascoe et al., "Issues in Developing Context–Aware Computing," Handheld and Ubiquitous Computing, First International Symposium, HUC'99 Karlsruhe, Germany, Sep. 27–29, 1999 Proceedings, pp. 208–221.

Emo Kovacs et al., "Adaptive Mobile Access to Context–aware Services," IEEE 1999, pp. 190–201.

D. Abowd, "Context–Awareness in Wearable and Ubiquitous Computing," Virtual Reality (1998) 3:200–211.

Chatschik Bisdikian et al., "WiSAP: A Wireless Personal Access Network for Handheld Computing Devices," IEEE Personal Communications, Dec. 1998, vol. 5 No. 6, pp. 18–25.

C.P. Louwrens and S.H. von Solms, "Selection of secure single sign–on solutions for heterogeneous computing environments," Part One Secure Information Systems, IFIP 1997, pp. 9–24.

Andrew J. Mazeikis and Glenn H. MacEwen,"A Communication Protocol for a Multi–Level Secure Network," Proceedings of TriComm '91 IEEE Conference on Communications Software: Communications for Distributed Applications & Systems, Chapel Hill, NC Apr. 18–19, 1991, pp.

Lawton et al., "An Interactive Model Based Vision System for Vehicle Tracking," 1993, pp. 403–409.

Eckstein et al., "Architecture for computer vision application development with the HORUS system," Apr. 1997, pp. 244–261.

Kuikka et al., "Transformation of structured documents," Electronic Publishing, vol. 8(4), Dec. 1995, pp. 319–341.

de Nitto Persone, et al. "Modeling and Evaluation of Prefetching Policies for Context–Aware Information Services," 1998, pp. 55–65.

Brown et al., "Context–Aware Applications: From the Laboratory to the Marketplace," Oct. 1997, pp. 58–64.

Halang et al., "High Accuracy Concurrent Event Processing in Hard Real–Time Systems," 1997, pp. 77–94.

Fulton, Jennifer, "Computer Maintenance, Part 1 First Step: Spring Cleaning," TOGGLE, Dec. 1999, pp. 1–3.

Nelson G. J., "Context–Aware and Location Systems", Ph. D. Dissertation, University of Cambridge, Jan. 1998.

Bahl P. and Padmanabhan V., "User Location and Tracking in an In–Building Radio Network", Technical Report MSR–TR–99–12, Microsoft Research, Feb. 1999.

Schilit, Bill N. and Theimer, Marvin M., "Disseminating Active Map Information to Mobile Hosts," IEEE Network, IEEE Inc. New York, US, vol. 8, No. 5, Sep. 1, 1994, pp. 22–32, XP000611167 ISSN: 0890–8044.

Sanchez, J. Alfredo et al., "Mutant: Agents asGuides for Multiple Taxonomies in the Floristic Digital Library," Digital 99 Libraries, 4th ACM Conference on Digital Libraries, Proceedings of 1999 Conference on Digital Libraries, Aug. 11–14, 1999, 'Online!', pp. 244–245.

Dix et al., "Exploiting Space and Location as a design ramework for Interactive Mobile Systems" vol. 7 No. 3 Sep. 2000 ACM pp. 285–321.

Karimi and Liu, "A Predictive Location Model for Location–Based Services" 2003 ACM pp. 126–133.

Maass Henning, "Location–aware mobile applications based on directory services" Mobile Networks and Applications 3 (1998) Baltzer Science Publishers BV pp 157–173.

Pokraev et al., "Context–Aware Services" From Colophon—Nov. 30, 2003 Telematica Institute.

* cited by examiner

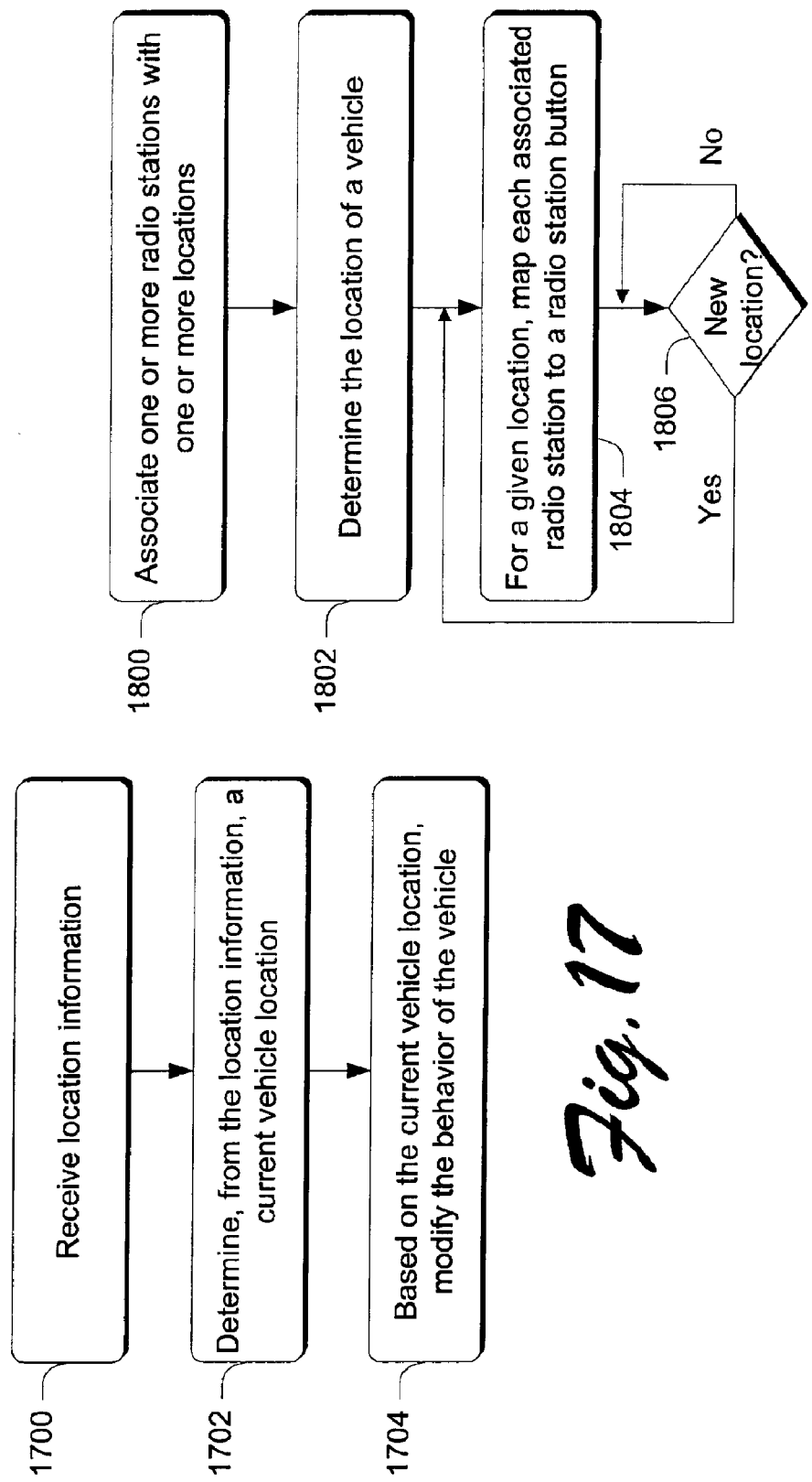

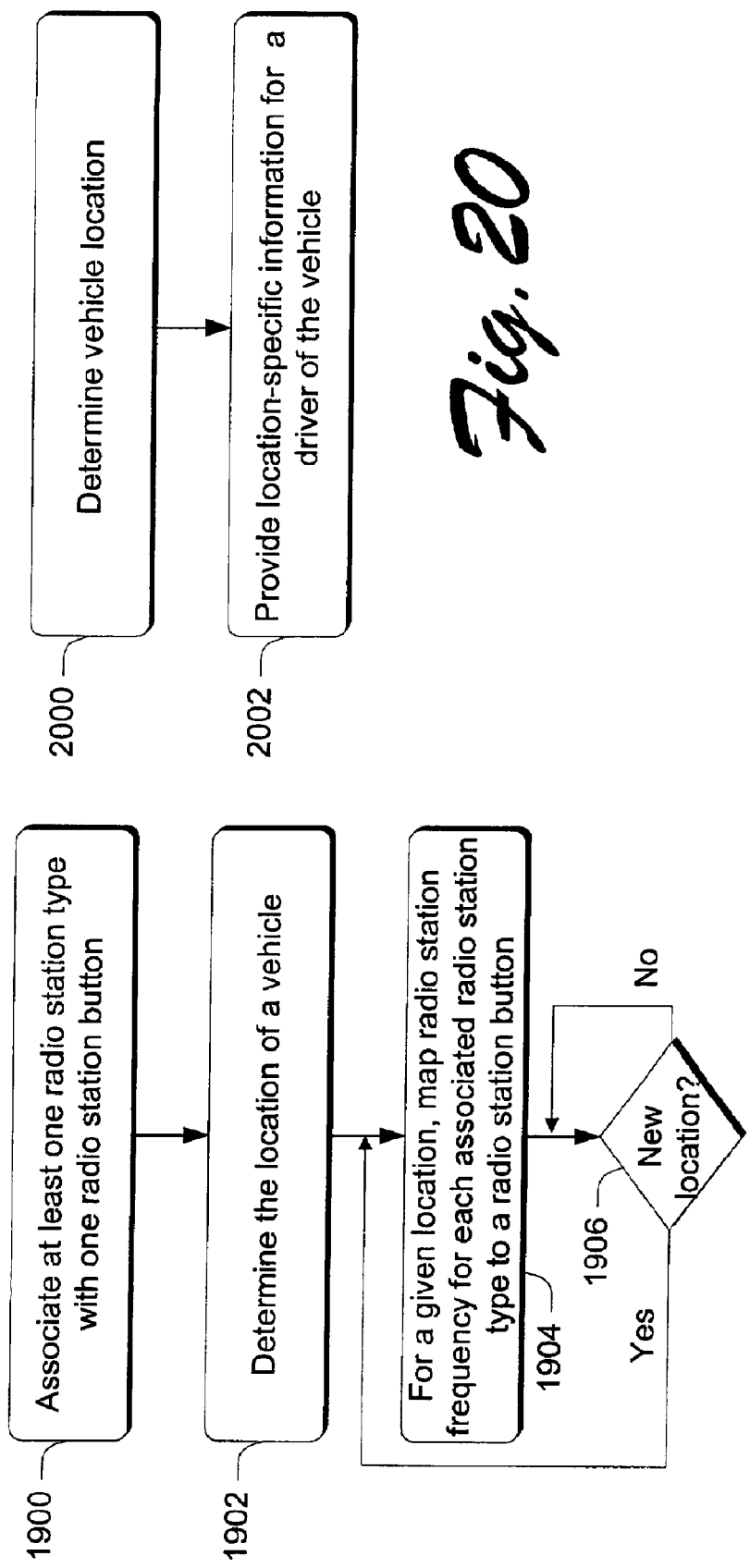

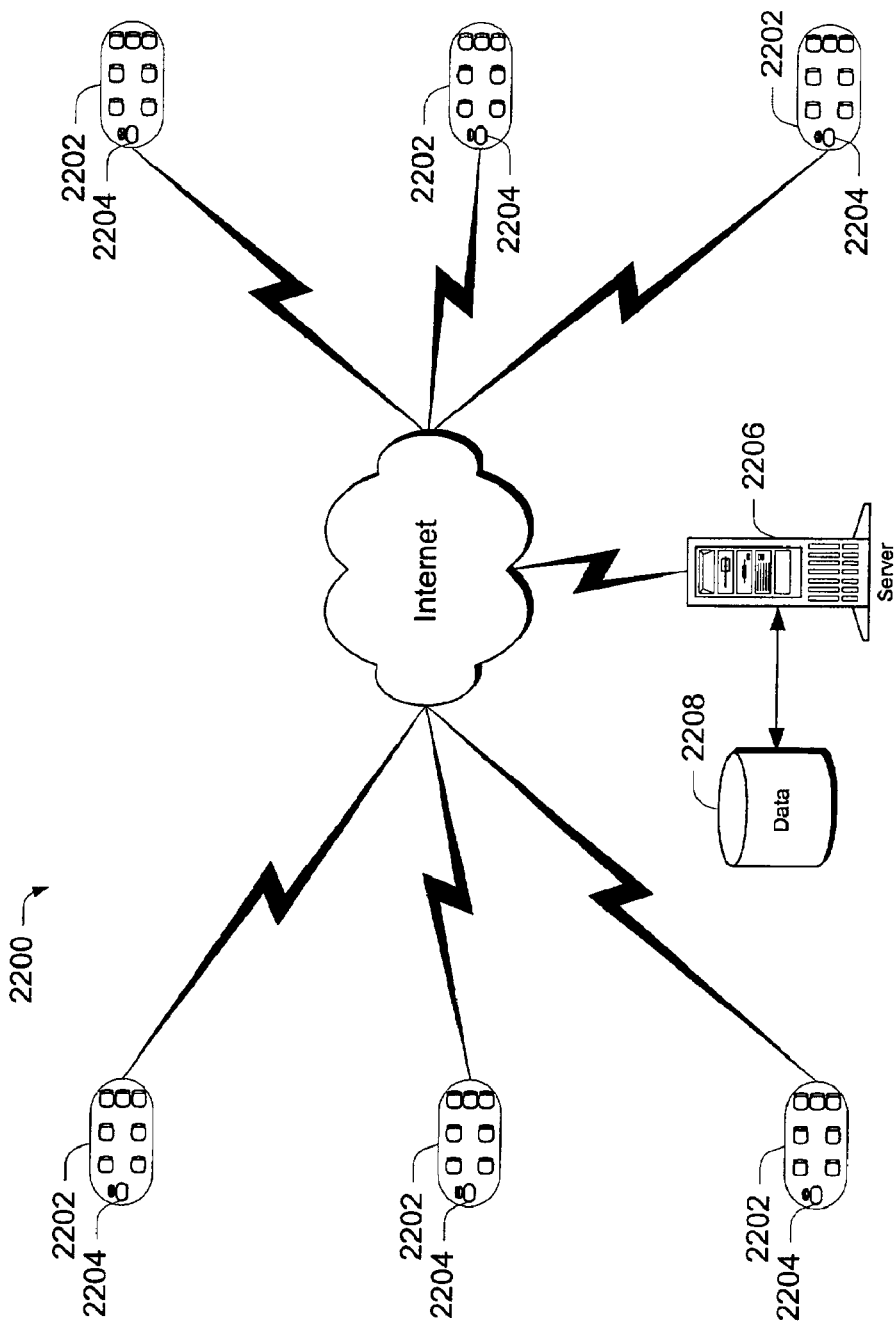

CONTEXT-AWARE SYSTEMS AND METHODS, LOCATION-AWARE SYSTEMS AND METHODS, CONTEXT-AWARE VEHICLES AND METHODS OF OPERATING THE SAME, AND LOCATION-AWARE VEHICLES AND METHODS OF OPERATING THE SAME

TECHNICAL FIELD

This invention relates to generally to the area of context-aware computing or ubiquitous computing.

BACKGROUND

The World Wide Web (WWW) was created to make content available from any source in any location around the world. Users of the Web are able to generally access a seemingly infinite number of resources via the Web. The Web has been highly successful in this regard. Yet, with the evolution of the Web, certain needs remain largely unmet. Specifically, people continue to have a need to access information that has a contextual aspect to it. That is, often times, individuals will find themselves in a computing environment that carries with it a certain context. Yet, the context of the environment cannot be easily incorporated into the present computing environment. As an example, consider the context of location. People generally have a need to access information, data, resources and the like, that have geographic dimensions to them. For example, individuals may desire to take advantage of services or products that are close in proximity to where they currently are located. In this regard, it is desirable to understand the individual's contextual location so that services, goods and the like can be made available to the individual. As "e-Commerce" continues to grow in importance, the necessity of bringing people, places, services and goods together in an efficient manner will become critically important.

To date, many attempts have been made to bring people, places, services and goods together. These various attempts have generally approached the problem from different directions in an often times incompatible manner. As an example, consider the context of location. Some services have attempted to bring people and services together by defining large databases that maintain information about the services. For example, a list of restaurants may be maintained in a web accessible database where each restaurant is associated with a zip code in which the restaurant is located. When a user desires to locate a particular restaurant, they might simply enter the zip code where they are located to see a list of corresponding restaurants in that zip code. From the list of restaurants, they might be able to select one or two restaurants of interest. This approach is undesirable for a number of reasons. First, the operation of the system is dependent upon a central server that is responsible for receiving user queries and executing the queries to return the information to the user. In the event the server fails, so too does the service. In addition, this particular service might be suited to finding restaurants, but possibly not other businesses. In addition, the granularity with which the results are returned to the user may foist some of the search burden on the user (i.e. the user gets a list of restaurants in a nearby zip code, but has to further explore the list to select which ones are of interest). Further, the list of restaurants may include some restaurants that are blocked by some type of a physical barrier (i.e. a river, mountain, etc.) that makes the distance, as the crow flies, unroutable.

Providers of services and products want to be connected to nearby end-users. End-users want to consume these services and goods at the closest and most convenient location. Acquiring the services of a dentist or a plumber that lives somewhere "out on the net" is not appropriate if you need them to fill a cavity or unclog a sink. Looking for the nearest hotdog while in a stadium requires you to stay in the stadium.

There is an unsolved need to be able to create context-aware computing in which computing devices can participate in their particular context. In specific circumstances, there are needs to provide relational position awareness among physical locations in both public and private views of the world. To date, however, there is no one standardized view of the world that would unlock the potential of context-aware computing. Context-aware computing is much more than just position awareness—although this is a very big field in and of itself.

This invention arose out of concerns associated with developing a standardized, context-aware infrastructure and related systems to unlock the potential of context-aware computing.

SUMMARY

Context-aware systems and methods, location-aware systems and methods, context-aware vehicles and methods of operating the same, and location-aware vehicles and methods of operating the same are described. In various embodiments, a context or location service module, implemented in software, determines a vehicle context or a vehicle location based upon information that it receives from various context providers or location providers respectively. Software executing on a vehicle's computer can then cause one or more applications that are associated with a vehicle computer to be modified in a manner that changes their behavior. The behavior modification is based on the current context or location of the vehicle and thus provides a context-specific or location-specific user experience. The context or location can be ascertained through the use of one or more hierarchical tree structures that comprises individual nodes. Each node is associated with a context or location. The nodes are traversable by the vehicle's software to ascertain a more complete context or location.

BRIEF DESCRIPTION OF THE DRAWINGS

FIG. 17 is a flow diagram that describes steps in a method in accordance with one described embodiment.

FIG. 18 is a flow diagram that describes steps in a method in accordance with one described embodiment.

FIG. 19 is a flow diagram that describes steps in a method in accordance with one described embodiment.

FIG. 20 is a flow diagram that describes steps in a method in accordance with one described embodiment.

FIG. 22 is a diagram of an exemplary system in accordance with one described embodiment.

DETAILED DESCRIPTION

Overview

Figure 1:
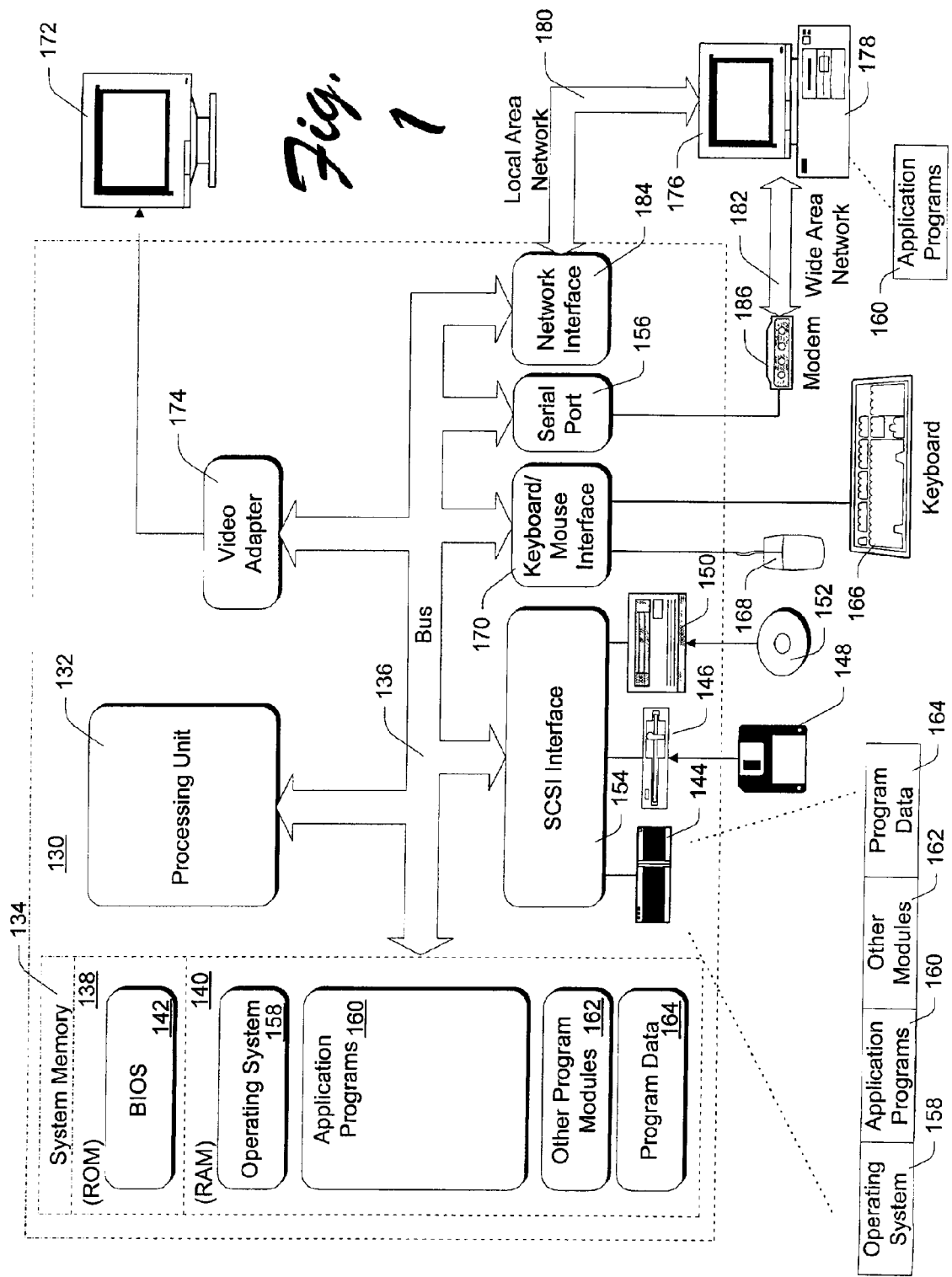
FIG. 1 is a diagram of an exemplary computing device that can be used in accordance with the described embodiments.

To provide a standardized solution, embodiments described just below provide a uniform definition of the world. The uniform definition is defined in terms of a hierarchical tree of nodes, where each node represents some aspect of the world. Each node is connected to at least one other node by a branch. An exemplary classification of nodes takes place on a physical level (e.g. physical locations such as political entities, infrastructure entities and public places), as well as a non-physical level (e.g. military APOs). This hierarchical nodal structure is referred to as the Master World, and is a standardized view worldwide. Each node of the Master World has various attributes associated with it that assist in context-aware computing. Exemplary attributes include a unique ID, name, geographic entity class, latitude/longitude, relative importance, contextual parents to name just a few. The Master World is useful because it can be used to determine the relative location of a place anywhere in the world and at any definable granularity.

Once an individual's location or a place an individual is interested in is determined, various services that reference the location can be offered to the individual based on their location. That is, value is provided by the Master World model in the ability to tie services to nodal locations in the Master World.

Building on this concept, two additional concepts add value—the concept of so-called Secondary Worlds and a "geozone."

A Secondary World is a powerful computing mechanism whereby individual entities (such as businesses or organizations) can define their own particular worlds that need not necessarily conform to the Master World view of the world. That is, while the Master World is essentially a physical hierarchical representation of the world, the Secondary Worlds can be physical and/or logical representations of each individual entities' world view. One particularly useful aspect of the Secondary World is that it links, at at least one point, into the Master World. Thus, within any Secondary World, a user's location not only within the Secondary World, but the Master World as well can be determined. Various services can be attached to the nodes of the Secondary World. Based upon a user's calculated position, these various services that are associated with Secondary World nodes can be offered to the user. In addition, because the user's context is determined relative to the Master World, other services that may not be associated with a particular Secondary World can be offered.

A geozone is essentially a spatial indexing mechanism by which the Master World is subdivided into individual zones. In the described embodiment, the zones are subdivided through the use of a quadtree algorithm that is dependent on a density function (although many other spatial index approaches can also be used). Once a desired density level is achieved (density might be defined in terms of points of interest per zone), each node on the Master World is assigned a particular geozone. Geozones enable proximity calculations to be computed in a fast and straight forward manner.

A useful aspect of the Master and Secondary Worlds are that they are "reachable" from various computing devices such as stationary (i.e. desktop devices) or mobile computing devices (i.e. cell phones, laptops etc.). That is, the Master World (or at least a portion of it) and one or more Secondary Worlds can be either locally maintained on the computing device, or accessed, e.g. via the Web or some other mechanism, so that a user can derive their context. For example, the Secondary World can be downloaded onto the computing device so that a user can derive their context within then Secondary World. One a user's context is determined from the Master World and one or more Secondary Worlds, a various robust collection of context-aware solutions become available to the user. For example, specific Secondary World services can be offered or Master World services can be offered. Additionally, services from other Secondary Worlds might also be offered since the user's location may be known (or made known) to these other Secondary Worlds. In this way, the Master World can link two or more Secondary Worlds together.

Another aspect is that the described embodiments harness the computing power of each computing device in determining the device's location. Here, by virtue of having the Master World and one or more Secondary Worlds reachable by the device (and possibly locally maintained on the device), the device itself determines its own context.

One embodiment provides a client side device that is configured to utilize the context-aware structures that are discussed above, i.e. the Master and one or more Secondary Worlds. The Master World or a portion thereof can be locally available on the device or can be accessible at another location, e.g. via the Web. In this embodiment, the client device has a location service embodied thereon. The described location service is a software module that can determine the location of the device and can answer queries from various applications (either executing on the device or off the device). The location service determines the location of the device by using the Master World and one or more Secondary Worlds. The applications query the location service through one or more Application Program Interfaces (APIs) or Events to get location information that is used by the applications to render a service.

The location service makes use of one or more location providers that convey information to the device. This information can be information that is specific to the location provider, or can be information that can be mapped directly into a node of the Master World or Secondary Worlds. Exemplary location providers can include Global Positioning Service (GPS) providers, cell phone providers (cell providers), Bluetooth providers, a user interface provider and the like. The location providers provide information that gives some aspect of a device's current location. This information is used by the location service to ascertain the location of the device.

One particularly advantageous feature of the client device is a standard or common location provider interface. The location provider interface enables the various location providers to provide information to the location service so that the location service can use the information to determine its location. Essentially, the multiple location provider interface is a common interface that enables multiple different location providers to provide location information (or hints) about location to a location service that is on a device. The location providers can provide the location information constantly, at intervals, or when polled by the device. The location information can be provided with confidence and accuracy estimates to enable the location service to evaluate the relative quality of the information before it is used. The various providers also have the ability to self-monitor themselves which assists in the providers' ability to intelligently convey information to the location service. By having a common interface, the collection of location providers is dynamically extensible—that is location providers can be added or removed from the collection of location providers without any interference of the functionality performed by the location service or device. The location providers can be added or removed while the device is operating. This is particularly useful in accommodating location providers that are developed in the future. In this particular embodiment, two levels of abstraction are provided i.e. (1) the provider interface that receives information from the location providers and (2) the API/events layer that enables applications to get at the various information.

One focus of this embodiment is a device that can collect context information (e.g. location information) from a variety of different sources, determine the device's current context from that information, and provide the current context at some level to one or more applications that can use the device's context to render a service or enable the device to participate in its context environment.

In the described embodiment, the device receives location information or hints about its location. This information is collated and mapped by the location service into a node in the Master World and/or Secondary World. The hierarchical trees can then be traversed to determine the device's accurate location in both the Secondary World and the Master World. At this point, the device has determined its context. The information that is collected can be subject to arbitration to ensure that only highly trusted information is used to determine context. The location information can be cached to provide "current location information" which, for a definable period of time will be accurate to some degree. Thus, if for some reason other location providers are unavailable, the cache can be used to ascertain location.

Once a device's location is determined, the device can apply a security policy to the information. Once this is done, the device can begin to answer queries from various applications.

One aspect of the described embodiment is a "favorite locations" aspect in which the device can be automatically configured, when it determines its context, so that it can adjust to the different locations.

Further, various types of location providers can convey different types of information. For example, a so-called "thin provider" provides location information that is translated by the location service into the appropriate node information. A so-called "thick provider" includes logic that takes location information and provides it in a form that can map directly into the Master World or Secondary World.

In another embodiment location translation services are provided that are directed to determining, as accurately as possible, the context or location of the device. In this embodiment, information is received from the various location providers. This information includes location, accuracy and confidence (all of which are provided by the location provider), trust (which is assigned to a location provider by the device or a user) and a timestamp (which helps to age the location information). The location translation processing involves determining which of the location providers are valid and active. The location providers can be ranked in accordance with the confidence and trust levels. This defines an ordered list of location providers. Provision is made for a situation in which all of the location providers may go inactive. If so, a "current location" is used as a location provider whose confidence decreases over time.

In the event that information from two or more of the location providers conflicts, then measures can be taken to use information for which there is a higher level of trust. The information that is provided by all of the location providers (assuming no conflict) can then be used to determine a tree structure and a node's entity ID (EID). The tree might be the Master World and the EID is a node on the Master World. The tree might also be a Secondary World and the EID (or location unique indentifier or "LUID") is a node on the Secondary World. Once this information is collected, complete location information can be determined by simply traversing the tree(s). Once a device's location is determined, a cache can be updated with the current location (including a time stamp).

In another embodiment, privacy issues in the context-aware computing environment are addressed. In this embodiment, the location service has acquired location information that pertains to the location of a particular device. A privacy manager determines what level of information to provide to applications that might request the information. The privacy manager can reside on the computing device itself, or can be proxied by a trusted third party.

According to this embodiment, a scale of privacy levels are defined. Each level is defined to include more or less specific information about the location of a particular device. A user is able to assign a privacy level to entities that might request location information. Additionally, each node of the Master World and a Secondary World can have a privacy level associated with it. When a query from an application is received, the privacy manager first determines who the query is from and the privacy level associated with the application or entity. The privacy manager then evaluates one or more of the Master World and the Secondary World to find a node that has a corresponding privacy level. When a corresponding node is found, information at that particular granularity is provided to the requesting application or entity.

In another embodiment systems and methods of providing a location provider in the form of a location beacon are described. In this embodiment, a location beacon is provided that can be mounted in various areas (public/private areas) to beacon the location to any computing devices within transmission range. The information that is transmitted enables a device to determine its location or context. The location beacon can transmit information that is specific to the location service that uses the information. Transmitted information can include an EID/URL pair, and a LUID/URL pair. The EID gives the node identification of a node in the Master World; and, the associated URL gives a protocol to communicate with the Master World. The URL might, for instance, link to a server that can provide additional context information that uses the EID. The LUID indicates a node on a Secondary World that corresponds to a current location; and the URL gives a protocol to communicate with the Secondary World. For example, the URL can link with a server that is hosting the Secondary World. This server can then be queried to discover more information about the Secondary World (i.e. Secondary World tree structure, location of associated resources, etc.) With the EID and LUID (along with the URLs), a device can now traverse the Master World or Secondary World to determine its location. Various technologies can be used to implement the beacon (wireless, RF, IR). The beacon can be a "program once" device to deter tampering. Programmable beacons can, however, be provided. Security can also be provided in the form of a verifiable signature that is provided with the beacon information to assure the veracity of the transmitted information.

A useful context-aware computing aspect of the beacon is the concept of "location-enabled access". That is, in addition to (or separately from) receiving location information, a beacon can transmit code download pointers that enable smart devices to access software code that allows the device to participate in its current context.

Exemplary Computing System

In the context of this document, the term "computing device" is used to refer generally to any type of computing device. Characteristics of exemplary computing devices are that they typically include one or more processors, computer-readable media (such as storage devices and memory), and software executing on the one or more processors that cause the processors to implement a programmed functionality. In particular embodiments, implementation takes place in the context of mobile computing devices (e.g. laptop computers and the like), and/or handheld computing devices (e.g. palm PCs, wireless telephones and the like).

FIG. 1 is a schematic diagram that constitutes but one example of a computing device that is suitable for use in connection with the described embodiments. It is to be understood that portions of the illustrated computing device can be incorporated in one or more of the computing devices (e.g. palm PCs, wireless telephones, etc.) with which particular embodiments are envisioned for use.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Defining the World

One of the problems to date with attempting to solve the context-aware computing problem is that every proposed solution has its own approach, data structures, processes and the like. There is little if any standardization between the various approaches. In the described embodiment, standardization is achieved at the foundational level by defining a universal view of the Earth. That is, a universally acceptable definition of the Earth is proposed and is useable in various computing scenarios to enable context-dependent computing. In this document, a specific example of context-dependent computing is given in the form of location dependent computing. It is to be understood that this constitutes but one example of a context in which the various embodiments discussed below can be employed. Other "contexts" can include, any information that can fit into a hierarchical structure including, without limitation, role/personnel in an organization, device categorizations, current activity, current environment, active devices and the like.

The Master World

A Master World is defined as a politically correct and publicly accepted hierarchical tree structure that catalogs physical location or geographic divisions of the Earth. The Master World is defined in such a way that many different classes of political, administrative and geographic entities across the entire Earth are included. Areas of political contention are accounted for by presenting a view of the world based on the language/locale of the computing device.

Figure 2:
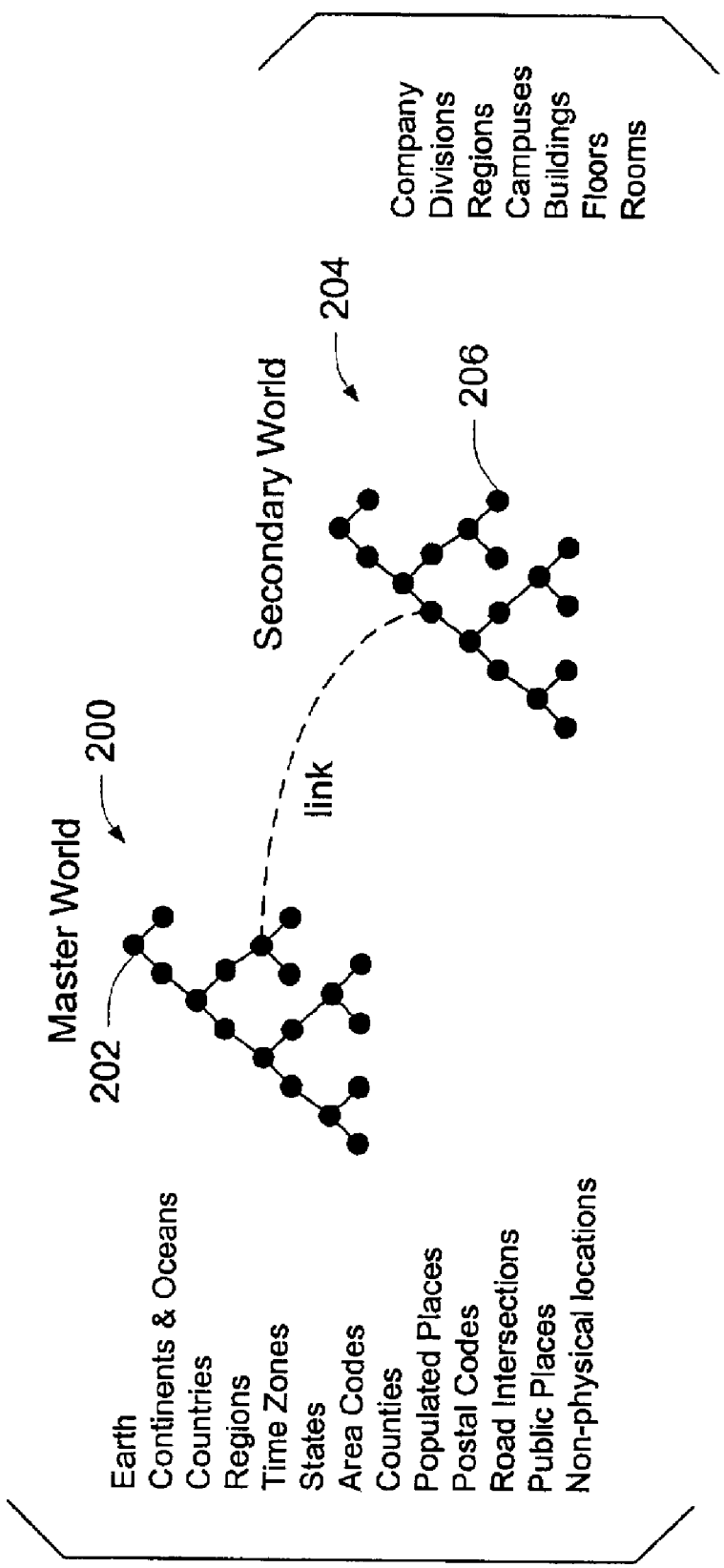
FIG. 2 is a conceptual diagram of an exemplary Master World and an exemplary Secondary World in accordance with the described embodiment.

FIG. 2 shows an exemplary hierarchical tree structure 200 that represents a portion of the Master World. The Master World contains multiple nodes 202, with each node representing some type of geographic division (e.g. political or natural entity) of the Earth. In the illustrated example, the nodes of the Master World are arranged in the following groups: (1) political or natural entities (e.g. continents, countries, oceans, states, counties, cities and the like); (2) infrastructure entities (e.g. postal codes, area codes, time zones and the like); (3) public place entities (e.g. parks, malls, airports, stadiums, and the like); and (4) non-physical entities (military postal code regions, vacation regions, affiliate coverage areas of television networks that can be geographically discontinuous, and the like).

In the FIG. 2 example, the top node of the tree structure represents the Earth. Each node underneath the top node represents a geographical division of the Earth. In this example, none of the nodes have an association with any businesses or services. That is, there is a distinction between node entities that are part of the Master World and non-geographic places where activities take place. Though the Master World includes nodes for public places (i.e. airports, malls, etc), it does not include individual listings of businesses or service providers. Each node is uniquely identified by an ID (EID or entity ID). In addition to the unique EIDs, a URL is associated with the tree structure and provides a context for the tree structure as will become apparent below.

As an example, consider the following: Seattle-Tacoma International Airport (SeaTac) will be included in the Master World, but references to individual airline business locations at SeaTac might be "leaves" on the tree that are tagged by the SeaTac Airport EID (see "Secondary World" section and the Table below). Similarly, the Seattle Center might be a node on the Master World, while the Seattle Arts Festival, Bumpershoot, the Seattle Sonics NBA Team, and the Seattle Center Starbucks Coffee Shop might be tagged with the Seattle Center EID. As another example, the Master World also contains nodes for all Interstate (motorway) exits. For example, the I-90, Exit 109, Washington is a node in the Master World. The Best Western Inn located at 1700 Canyon Road in Ellensburg, Wash. might be tagged with the EID of this Exit.

Thus, the Master World provides a uniform way of defining locations. The uniform location definitions can then be universally used to assign attributes to goods or services. Whenever a computing device determines its location to correspond to a particular uniform location definition, it can take advantage of the location-dependent goods or services that share the uniform location definition. The Master World is useful because it is a standardized view of the world. Its accurate standardized geographic dimension attribution can be easily accessed by both providers and consumers. Services and product providers (or third parties such as search engines, network and yellow-page database directories) can use the nodes of the Master World by assigning a standardized persistent geographic reference to all commerce locations or points of interest. These commerce locations or points of interest can be considered as "leaves" on the tree structure.

In the illustrated example, the nodes of the Master World have one or more attributes that facilitate its use. Exemplary attributes are described in the table immediately below:

| Attribute | Description |
| --- | --- |
| Entity ID (EID) | The EID is a unique ID for each node. No two nodes have the same EID. |
| Name | The name is defined in terms of the neutral ground truth (NGT) name. The NGT name supports various language translations for entity names as appropriate (e.g. Pacific Ocean, Pazifischer Ozean, Oceano Pacifico, etc.) |
| Geographical Entity Class (GEC) | The GEC is a geographical classification of each node. An exemplary GEC is discussed below in the "Geozone" section. |
| Latitude | The horizontal coordinate position on the globe (i.e. the coordinate position of the node's centroid) |
| Longitude | The vertical coordinate position on the globe (i.e. the coordinate position of the node's centroid) |
| Relative Importance | The geographic importance of an entity in reference to other entities in the same region. Value from 1 to 256 (e.g. New York City = 3, Los Angeles = 4, and Omaha = 5 even though Omaha is much smaller but almost as important in relation to surrounding populated places) |

-continued

| Attribute | Description |
| --- | --- |
| Contextual Parent(s) | The parents of the parent/child relationship for each node. Multiple parents are supported (e.g. Redmond is a child of King County, Area Code 425, the Pacific Time Zone, and the MSNBC affiliate KING TV). |
| Source | The source of origin for the record (e.g. Microsoft or a specified data vendor) |
| Start Date | Date when the node information was first valid |
| End Date | Date when the node information was last valid (retired zip codes, breakup of countries) |
| Modification Date | Records date changes that are made to the record relating to retirement or updates to any fields |
| Status | Active, lashed (links duplicate nodes together), pending or retired |

The attributes listed above constitute exemplary attributes only. Other attributes that are different from and/or additional to those referenced above could be used. A few exemplary entity or node records that employ the above attributes are shown below:

| | |
| --- | --- |
| Entity ID (EID) | 24948 |
| Name | Pacific Ocean, Pazifischer Ozean, Oceano Pacifico, etc. |
| Geographical Entity Class (GEC) | 138/Ocean |
| Latitude | 0 (+000° 00' 00") |
| Longitude | −170 (−170° 00' 00") |
| Relative Importance | 1 |
| Contextual Parent(s) | World |
| Source | MSFT GeoUnit |
| Start Date | 0/0/00 |
| End Date | 0/0/00 |
| Modification Date | 01/18/00 |
| Status | Active |
| Entity ID (EID) | 27490 |
| Name | Redmond |
| Geographical Entity Class (GEC) | 78/non-capital town |
| Latitude | 47.6768303 (+047° 40' 36") |
| Longitude | −122.1099625 (−122° 06' 35") |
| Relative Importance | 107 |
| Contextual Parent(s) | 1. King, second level [Washington, United States] 2. Puget Sound-Seattle, travel region [Washington, United States] |
| Source | MSFT GeoUnit |
| Start Date | 0/0/00 |
| End Date | 0/0/00 |
| Modification Date | 01/18/00 |
| Status | Active |

The Master World also serves as a repository of common denominator links between itself and various "Secondary Worlds" and as a conduit that connects Secondary Worlds to other Secondary Worlds. Content, service and device providers can use the Master World to associate their publicly available offerings with a geographic location and the corresponding multiple branch hierarchical structure. This location will be associated with a single entity within the tree structure thereby allowing geographic and time/distance calculations and the necessary parent/child relationship navigation.

The Master World Index (Geozones)

By definition, the Master World provides a hierarchical structure of entities (nodes) that cover the entire globe. Upward navigation within the hierarchy is quite natural. Efficient navigation downward requires geographic proximity awareness. Additionally, there are possible scenarios that will require jumping from branch to branch in order to successfully return values in a query, or for more accurate calculations of distances to close "leaves" attached to nodes other than the original source node. The Master World makes use of an index scheme that can identify peer level nodes by virtue of the geographical proximity. This indexing scheme makes use of a quad tree algorithm to define so-called "geozones."

A quadtree is essentially a spatial index that breaks coverage into homogeneous cells of regularly decreasing size. Each quadrant of the tree has up to four children. The quadtree segmentation process can continue until the entire map is partitioned based on many different end result criteria including the density of the number of items (e.g. points of interest) in each quad. The approach provides a form of spatial index that accelerates spatial selection and content identification.

To complete the spatial indexing scheme to provide each node with a defined geozone, a quadtree algorithm is applied to the nodes and can be based upon a desired density of, for example, points of interest that are to occur in any one zone. Once all of the zones have been defined, each zone is given a unique ID (e.g. top/left and bottom/right Latitude and Longitude pairs). Each of the nodes of the Master World is then assigned a zone in which it is located. Quadtree algorithms are known and will be appreciated by those of skill in the art.

The Master World Location

As can be appreciated, having a uniform standardized representation of the world in the form of a hierarchical traversable tree structure can greatly facilitate the manner to which context-dependent, and more specifically, location-dependent goods and services can be linked.

In the described embodiment, a computing device has access to at least a portion of the Master World. For example, the computing device can have the Master World saved in an internal storage device, it can comprise part of the computing device's operating system, or the device might access the Master World via a network medium such as the Internet. With the Master World tree structure being accessible to each computing device, each device has the power to determine its own context or node-referenced location. That is, the computing device can determine, through software it is executing, its particular location, i.e. node. Once the computing device determines an associated node, it can simply traverse the tree to ascertain its complete location.

For example, if a computing device determines that it is currently located at a node that corresponds to the City of Redmond, it can traverse the Master World tree structure to ascertain that it is in the State of Washington, Country of The United States, on the continent of North America. By ascertaining its precise location, the computing device (or its user) is now in a position to take advantage of location-dependent services that might be offered. This particular model is a tremendous improvement over current models that utilize a central server to ascertain location for a number of different devices. In that model, each device (or user) provides information about its location (e.g. perhaps the user enters the zip code or city that the device is currently in) and might enter a query to find, for example, a McDonald's restaurant in his zip code. The server then takes this information and might, for example, tell the user about the location of all of the McDonald's restaurants within that zip code or city. If the servers fails in this model, then none of the computing devices can take advantage of its services. In the present model, each computing device is self-sustaining. Each can determine its own location, and accordingly, each device can take advantage of location-dependent services. For example, if the computing device understands that it is located on a particular node of the Master World, then it can execute queries to find a McDonald's that has an EID that corresponds to the particular node in which the computing device is located. Particular robustness is provided through the use of the above-described geo-zones. The geo-zones enable proximate geographic divisions to be quickly searched in an efficient manner. For example, if an individual is looking for the nearest Kinko's to make copies and none are located in the geo-zone that corresponds to the node in which the computing device is located, then adjacent geo-zones can be quickly searched.

Secondary Worlds

In the described embodiment, the concept of a Secondary World is used to provide support for additional context. A secondary world might be defined by a third party organization or company and contains nodes that comprise physical and/or logical entities that are unique to that organization. The nodes of the Secondary World may or may not have much context outside of the particular organization that defined the Secondary World, since a secondary world could be made either public or private. The Secondary Worlds do not duplicate the Master World, but rather supplement it in a unique, organization specific manner. While the Master World is defined to be a widely accepted standard, each Secondary World can be a widely variant representation of an organization's proprietary view of the world. In the described embodiment, each Secondary World has at least one node that is linked with a node of the Master World. This gives the Secondary World a context or location in the Master World. Also note that in some context applications, several secondary worlds may be accessed, each providing additional context specific pieces of location data.

FIG. 2 shows an exemplary Secondary World 204 that comprises a plurality of nodes 206. Each of the nodes 206 constitutes a physical or logical entity. For example, the nodes can constitute a company, its divisions, regions campuses, buildings, floors in various buildings and rooms on various floors. At least one of the nodes is linked with a node of the Master World. The nodes of the Secondary World can have the same attributes as the nodes of the Master World.

As an example of a Secondary World, consider that Boeing might define a Secondary World that includes a list of entities that are important to its employees. The root entity would be "Boeing Corp." and its children might be company divisions (St. Louis Military Division, Everett Plant, Corporate HQ, etc.). Further down the tree structure, individual nodes might be defined to represent individual buildings (Hanger 12, offices within this building (Office 1001), building areas (Southwestern quadrant of hanger 12), etc. Each entity or node has a unique identifier (Local Unique ID or "LUID") and a URL that is associated with the tree on which the node occurs. The URL uniquely identifies the Secondary World tree structure so that a user within that world can determine how to interact with the world. This aspect is discussed below in more detail. Boeing can then use the LUIDs to associate equipment, services, departments or even personnel to a physical or logical location.

Figure 3:
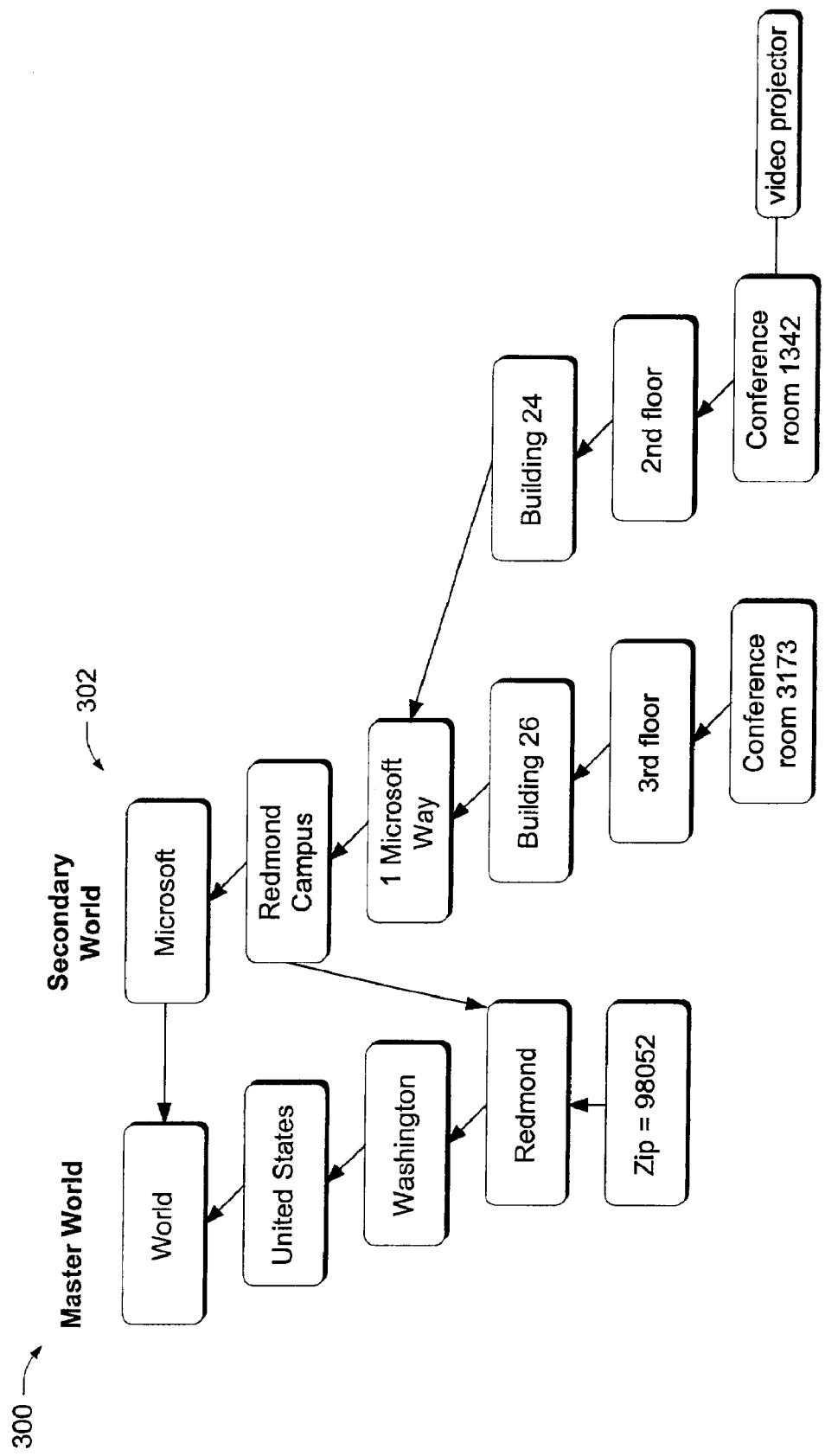
FIG. 3 is an exemplary specific view of a Master World and a Secondary World and their relation to one another.

As a more concrete example, consider FIG. 3 which shows an exemplary portion of the Master World 300 and a Secondary World 302. Master World 300 includes the following nodes: World, United States, Washington, Redmond, and Zip=98052. The exemplary Secondary World 302 is a hierarchical tree structure that has been defined by Microsoft Corporation and includes the following nodes: Microsoft, Redmond Campus, 1 Microsoft Way, Building 26, $3^{rd}$ floor, Conference Room 3173, Building 24, $2^{nd}$ floor, Conference Room 1342. In this example, the Secondary World 302 "touch points" into the Master World from the Redmond node. In this example, a video projector is shown as being associated with the node "Conference room 1342". Here, the video projector is not a node in the secondary world. Rather, the video projector is an item in some other resource discovery service (e.g. the active directory) and includes a location attribute that is a pointer to "Conference room 1342." There may be times, however, when nodes can be created in the worlds to represent the location of key services—the node themselves, however, would not represent the services.

Like the Master World, the Secondary World is advantageously accessible to a user's computing device. It could, for example, be downloaded—completely or partially—and stored on a storage device and accessed when needed. It might be downloaded for a one time use only. The Secondary World enables the computing device to ascertain its context within the Secondary World. In this example, the computing device would, by using the Secondary World, compute its location within the Secondary World. The computing device can do this by traversing the tree structure from the node in which it is currently located to the root node. This would, for example, give the computing device (and hence the user) a complete Secondary World context. Once the Secondary World location is known, the user is in a position to take advantage of goods or services that are associated with the nodes of the Secondary World. That is, once the computing device determines its Secondary World context, it is ready to become an active participant in the Secondary World.

Tremendous value can be achieved by associating goods or services with the individual nodes of the Secondary World. For example, Conference Room 1342 has a video projector associated with it. That is, the location of the video projector is in Conference Room 1342. Assume that an individual in Conference Room 3173 has a presentation that requires the use of the video projector such as the one located in Conference Room 1342. Normally, an individual would have no way of ascertaining the location of the video projector other than perhaps physically calling over to the building to check whether there is a video projector available. In this example, because the user's computing device is able to ascertain its location within the Secondary World, it is able to locate the video projector in Conference Room 1342. It would do this by simply executing software that traverses the Secondary World tree structure to find the resource of interest.

Note also that because there is a link into the Master World, the computing device is able to derive it context (location) within both worlds. This enables the computing device, and hence the user, to take advantage of goods and services that are associated with the Secondary World, as well as participate in location-dependent services that are consumable based upon the user's location in the Master World.

Figure 4:
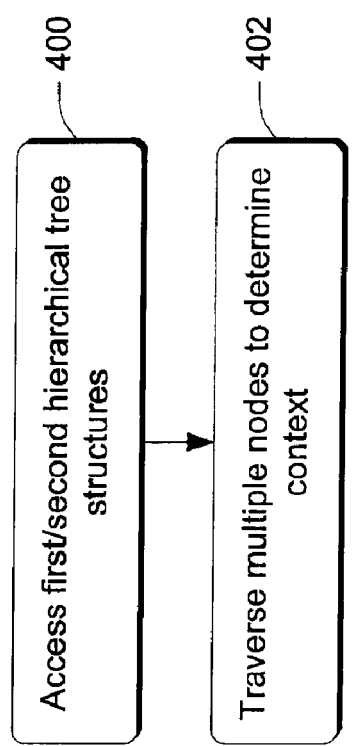
FIG. 4 is a flow diagram that describes steps in a method in accordance with the described embodiment.

FIG. 4 is a flow diagram that describes steps in a method in accordance with the described embodiment. The steps described just below are implemented by a computing device which, in the illustrated example, is a hand-held mobile computing device.

Step 400 accesses first and second hierarchical tree structures that are resident on a computer-readable media. In this example, the tree structures might be stored on the device or might be accessible via a network such as the Internet. An exemplary first tree structure is the Master World and an exemplary second tree structure is a Secondary World. Alternately, the tree structures could both be Secondary Worlds. Once the tree structures have been accessed by the device, step 402 traverses multiple nodes of the tree structures to derive the context of the computing device. In this example, the computing device receives information that informs it as to its location at a node of one of the trees. This information can come to the computing device in any suitable way, e.g. a user can enter the information through a User Interface (UI) or the location might be broadcast to the computing device by another computing device (e.g. through the use of Bluetooth technology or Universal Plug and Play (UpnP). Specific examples of how this information can be conveyed to the computing device are given below in more detail. Regardless of how this information is conveyed to the computing device, once the computing device has the information, it executes software that traverses one or both of the tree structures to derive its context which, in this example, is the device's location.

Defining Secondary Worlds

As was mentioned above, one particularly valuable aspect of the described embodiment is that individual organizations can define their own Secondary Worlds. This gives the organization a great deal of flexibility in providing goods and services and, more broadly, increasing the efficiency of their organization. In one embodiment, a software tool is provided that enables individual organizations to define and maintain their own Secondary Worlds.

In one embodiment, each secondary world can be uniquely identified as a name space (e.g. an XML namespace). This ensures that any overlap in names between the Secondary World and the Master World will not result in a collision. As an example, consider the following: the Master World might contain an entity identified as "Chicago" referring the city. A Secondary World that is established by the National Basketball Association (NBA) and a different Secondary World that is established by the Caterpillar Corporation might also have entities named "Chicago" that refer to completely different entities than the Master World's "Chicago." For example, the NBA's "Chicago" might refer to an NBA market area while Caterpillar's "Chicago" might refer to a sales district. Having the namespace separation between the Master and Secondary Worlds can ensure that there not a collision between identically named entities because each name space is uniquely different from every other namespace.

Figure 5:
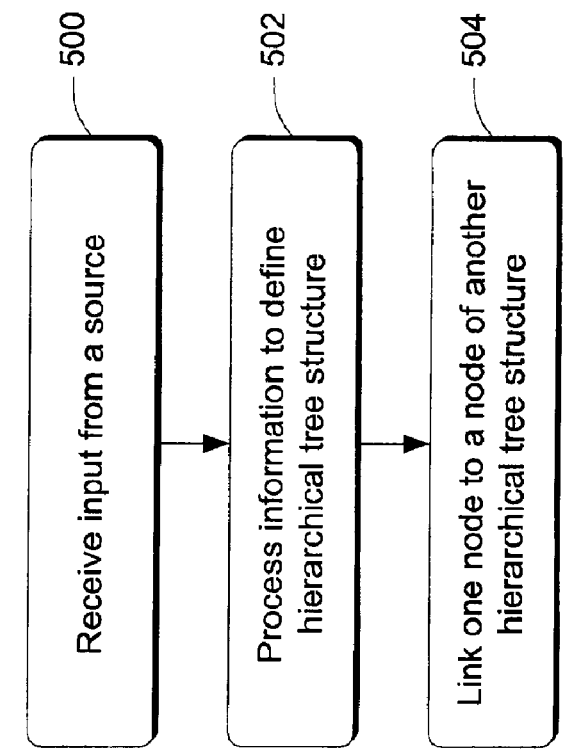
FIG. 5 is a flow diagram that describes steps in a method in accordance with the described embodiment.

FIG. 5 is a flow diagram that describes steps in a method of building a context-aware data structure. These steps are implemented by a software tool that is executing on a computing device.

Step 500 receives input from a source that specifies information that pertains to physical and/or logical entities. In this example, a system administrator might physically enter information about the structure of the Secondary World that they desire to define. This information can include information about buildings, divisions, conference rooms and the like. Step 502 then processes the information to define a hierarchical tree structure that has a context. In this example, the context is location. It will be appreciated, however, that other contexts could be employed. Each of the nodes in the hierarchical tree structure represents a separate physical or logical entity. Step 504 then links at least one of the nodes of the hierarchical tree structure with another tree structure having a context. In this example, this other tree structure can comprise the Master World. Once the tree structures have been built and linked, they are ready for traversal in a manner that enables context to be derived from one or more of the nodes.

Location as a Service

In the above examples, the computing device is able to determine its own location. In the embodiment about to be described, the computing device determines its location by using location information that is provided to it from a number of different sources of information. The device is able to take the information that is provided to it and process the information to determine a particular node on one or more hierarchical trees. Once the device has done this, it can determine its complete location which is a useful thing to know particularly when there are location-dependent services that can be consumed by the device's user.

Figure 6:
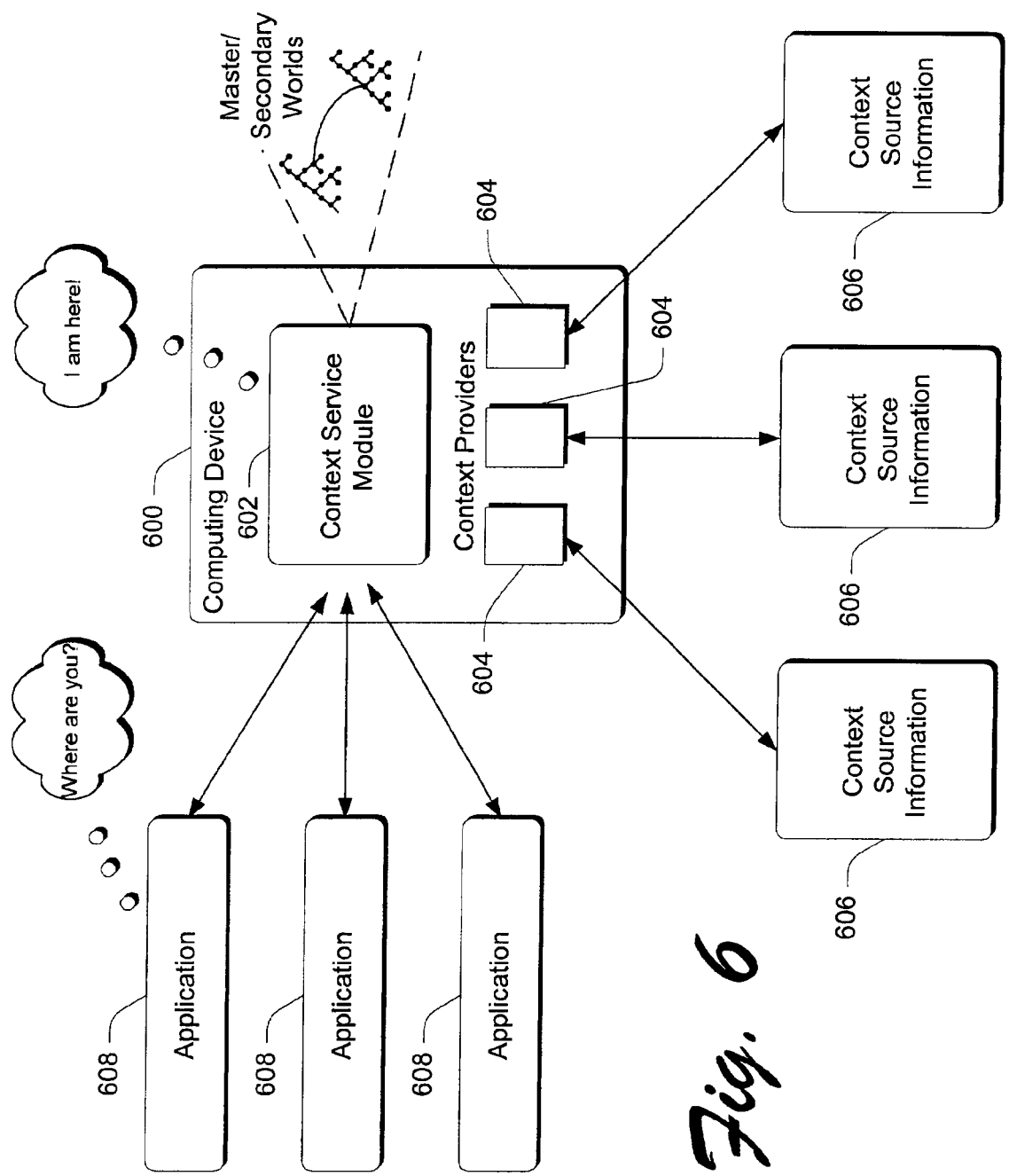
FIG. 6 is a high level diagram of an exemplary computing device architecture.

FIG. 6 shows a high level diagram of an exemplary computing device 600 that comprises, among other components, a context service module 602 and one or more context providers 604. The context service module 602 can be implemented in any suitable hardware, software, firmware or combination thereof. In this particular example, the context service module is implemented in software that is executed by one or more device processors. The context service module 602 receives context information from one or more context providers 604 and processes the information to determine a current device context. In this particular example, the device context is the device's location. Accordingly, the context providers are location providers that provide location information, in various forms, to the context service module 602 for processing. The location providers 604 receive information from various sources of context information (location information) 606.

In the context of this document, a context provider comprises a software component that can either be implemented on the device or off the device. The context provider can also include any suitable hardware, firmware or combination thereof. The role of the context providers are to receive information from sources 606 and convey the information to the context service module 602 so that the context service module can use the information to determine a current device context.

In the case where the context of the device is the device's location, sources 606 provide various information to the location providers 604 that pertains to the device's current location. As an example, the sources of the information can include various information transmitters such as a GPS system, cell phone or cell ID, wireless transmitters that transmit location information, location beacons, 802.11 transmitters and various other sources of information. The sources of information can also include other computing devices that might, for example, provide location information through Bluetooth technology. In addition, a source of information 606 might include a person who, for example, physically enters location information into the device 600 so that the device can process the information to determine its location.

When the device 600 receives the location information from the sources 606, it processes the information with the location providers 604 and provides the information to the location service module 602. The location service module 602 processes the location information and determines a particular node on one or more of the hierarchical tree structures to which it has access which corresponds to its current location. The location service module 602 can then traverse the tree structures to determine a complete location for the device. Once the complete location is determined, the device 600 can begin to interact with one or more applications 608 that can query the device about its particular location so that one or more location-dependent services can be rendered to the device. In this example, the applications 608 are illustrated as being separate from the device. It is to be understood, however, that the applications could be executing on the device, e.g. a browser application.

As shown, the applications 608 can make calls to the device to ask the device where it is located. The device is configured to receive the calls and respond in an appropriate manner to the application. Once the application has the device's location information, it can then render location specific services to the device.

Consider the following example: You are a traveler and have a hand-held mobile computing device that contains a Master World tree and a Secondary World tree for SeaTac International Airport. You are scheduled to depart on a plane for China from Concourse C. SeaTac International Airport has designed its Secondary World to have the following nodes: "Arrivals", "Departures", "Concourses", "Airlines", "Gates assigned to Airlines", and "Gate Location". When you arrive at the airport, as you enter the airport your computing device receives location information from different sources and with that information your device determines that your location is in the Arrivals node. SeaTac International has bank of servers that are executing applications to assist you while you are in the airport. There are applications that can help you find services, locate facilities (e.g. coffee shops, restaurants), give directions (e.g. how to get to your departure gate), update you on the status of your flight, and even check you in automatically for your flight. Consider also that as you walk through the airport your location changes. Your computing device, however, can receive continuous location information updates so that it can continue to determine its location as you move through the airport. At one point, as you pass a Starbucks coffee shop, your hand held device notifies you that if you purchase a latte at Starbucks and present your hand held device, you will receive a 50 cent discount on your latte. In this example, the utility of the Secondary World is demonstrated. By knowing where its particular customers are in its facility, SeaTac International is able to provide a host of services that were not possible before.

Assume further that you are in the airport and your flight is canceled. You must find a place to stay for the night. Accordingly, you wish to determine the closest Double Tree hotel because you really like the warm chocolate chip cookies they give you when you check in. You execute a search engine on your computing device to find the nearest Double Tree hotel. The search engine application first determines your current location in the Master World as indicated by the EID of the Master World node that corresponds to your location. Executing a search, the search engine application looks for a Double Tree hotel that has an attribute that includes an EID that matches your EID. If it finds one, it simply indicates for you the result. If it does not find one with the corresponding EID, it can use an adjacent geozone to search for a Double Tree hotel. It may also provide driving directions to the hotel. The search engine application was able to do this because it was able to ascertain your location in the Master World. It did this quickly and automatically with little or no effort from you.

Consider further that as you are driving from the airport to the hotel you decide that you want to find the nearest Kinko's so that you can print 100 copies of a presentation that you are to give in the morning. Consider that your hand-held computing device is a cellular phone and that Sprint is the carrier. Sprint has defined its own Secondary World that might, for example, be designated in terms of cell nets. By virtue of having Sprint's Secondary World on your computing device, you are able to ascertain your location in Sprint's Secondary World and, accordingly, your location in the Master World. Consider that Kinko's also has a Secondary World that links with the Master World. By executing a search application on your device, you are able to ascertain the location of the nearest Kinko's as well as driving directions thereto. All of this is possible because your device has access to the Master World and one or more Secondary Worlds. In this example, the Master World provides a mechanism to daisy chain two or more Secondary Worlds together. This is possible because the Secondary Worlds have at least one reference or link into the Master World.

Exemplary Device Architecture

Figure 7:
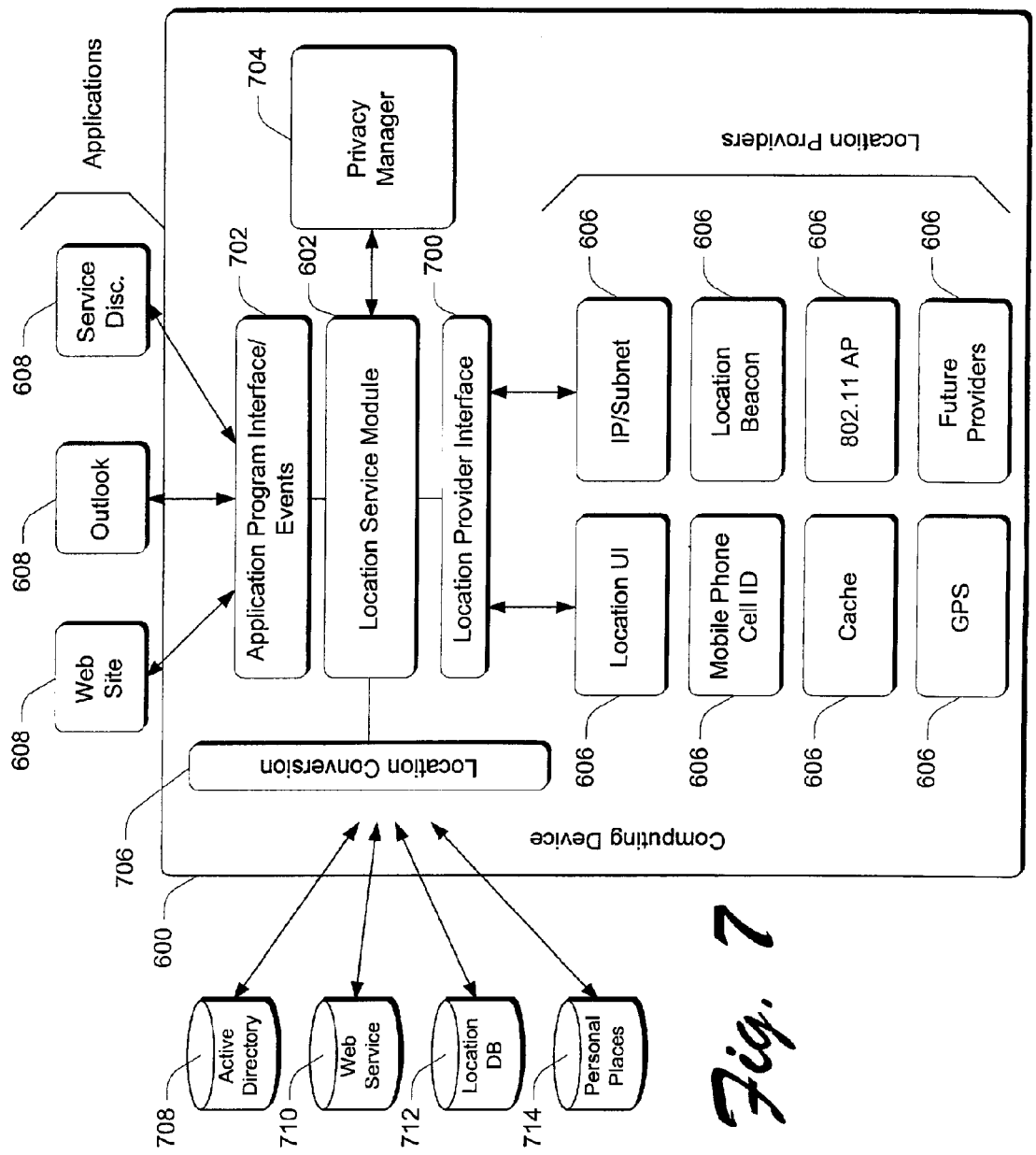
FIG. 7 is a somewhat more specific view of an exemplary computing device architecture.

FIG. 7 shows computing device 600 in somewhat more detail. In this particular embodiment, device 600 comprises an architecture that includes the following components: a location service module 602, a location provider interface 700, an application program interface (API)/Events module 702, a privacy manager 704 a location conversion module 706, one or more applications 608 and one or more location providers 606. Also included in the architecture is an active directory 708, Web service 710, location database 712, and personal places 714. The architecture can be implemented in any suitable hardware, software, firmware or combination thereof. The architecture mentioned above is advantageous in that it enables each computing device to determine its own context or location.

Common Location Provider Interface

One particularly advantageous aspect of the described embodiment is that it employs a common interface 700 that provides a standard interface through which the location providers 606 communicate. By having a common interface, the location providers are extensible (to support future providers) in that they can be dynamically added or removed from the collection of location providers. All that is required of a particular location provider 606 is that it be written to support the common interface.

In this example, there are several location providers 606. These location providers provide location information in different forms. For example, a GPS location provider might provide location information that is GPS specific. Similarly, an IP/Subnet location provider might provide information that is specific to an Internet Protocol. A mobile phone location provider might provide location information in the form of a cell ID. In addition, a location User Interface (UI) might provide location information in the form of a user entry that specifies a city, street or building. All of the location information that is provided by the various location providers is processed by the location service module 602 so that a current device location can be determined. To determine the current device location, the location service module 602 may have to consult with an active directory 708, a Web service 710, or a location database 712. In the illustrated example, the active directory 708 might, for example, maintain a secondary world and other networking metadata such as subnet and "site" information that can help determine location based on networking connectivity. Web service 710 can hold the master or secondary worlds, the attributes of which can be used to find location. For example, if a cell phone knows its cell tower ID, then the location provider can query the secondary world to ascertain the nodes that match that cell tower ID. Location database 712 is basically a version of the web service that is hosted or cached locally.

Location Providers

As indicate above, the architecture contemplates multiple different location providers that can provide location information to the location service module 602. This information can come in many different forms and quality levels. The information is then processed by the location service module 602 to determine a current device location. To do this, the service module 602 ascertains from the location information a particular node ID (EID and/or LUID) and a URL that is associated with the tree structure with which the node is associated. Once the location service module ascertains a node ID, it can then query the tree structure (or more accurately a server that manages the tree structure) using the URL to ascertain more information about the tree structure. For example, if the location service module 602 ascertains a LUID from a particular Secondary World, it might then query an active directory 708 (or an Intranet server—which is another location database) to discover the parents and the children of the node. This would then enable the location service module to build the Secondary World.

The location providers 606 can provide the location information to the location service module 602 in many different ways. For example, some location providers 606 may continuously provide information (e.g. the GPS provider may continuously provide GPS coordinates). Alternately, the location providers can periodically provide location information such as at specific times or on the occurrence of definable events. For example, a user may define specific times when the location information should be updated. Alternately, the location information might be updated only when a device's location changes (i.e. a location change event). Additionally, the location providers might provide location information when polled by the location service module 602. For example, the location service module 602 can call the location provider interface 700 and request location information from one or more of the location providers.

One specific location provider 606 is shown as a cache. The cache provider essentially maintains a current device context or location. That is, once the location service module 602 has ascertained its current location, it writes this location to a cache. This enables the device 600 to ascertain its location with a degree of confidence in the event all of the other location providers are not able to provide location information (e.g. the GPS provider may not receive GPS information because the GPS transmitter that supplies it with the information is unable to contact a requisite number of satellites).

Confidence and Accuracy Parameters

One important and useful feature of the described embodiment is that one or more of the location providers are configured to assign confidence parameters and/or accuracy parameters to the information that they provide to the location service module 602. Confidence parameters provide a measure of a provider's confidence in the information that it provides to the location service module 602. For example, assume that a GPS transmitter must receive information from five or more satellites in order to provide highly confident information. Assume that only three satellites are available at the time. The GPS transmitter would then transmit its information based only on the three satellites. The GPS provider would then know that the information it receives from the GPS transmitter was based only on three satellites rather than the desired five or more. In this case, the GPS provider can set a confidence parameter on the location information that indicates that it has a lower confidence level than if the information were based on the desired five or more satellites. In this case, the location service module 602 can take the confidence parameters for all of the location providers into account when determining the location of the device. This is discussed in more detail below.

With respect to the accuracy parameters, consider that the location information that is received from the location providers is accurate to varying degrees. Some information may be accurate to within one mile, while other information may be accurate to within 100 feet. The location providers are desirably configured to assign accuracy parameters to the location information that they provide to the location service module 602. The accuracy parameters give the location service module an indication of the accuracy of the information.

When the confidence and accuracy parameters are used by the location service module 602, the module can make decisions on how to use the location information it receives from each provider. For example, the location service module 602 might disregard completely any information that has a low confidence parameter. It might, on the other hand, strike a balance between the accuracy of the information and its confidence. For example, the module 602 might be programmed to use information with lower levels of accuracy only when there is a high level of confidence in the information. The module 602 might utilize the parameters to assign weights to the information so that the location is calculated as a weighted function of the confidence and accuracy of the information.

Another use of the confidence parameters is as follows: Assume that the location service module has determined a device location and has written that location to a cache. At the time when the location is written to a cache, it is assigned perhaps a high confidence level. Assume further that all of the other location providers are unavailable to provide location information. For a period of time, the location service module 602 can use the cache location as a current location and be fairly confident that its information is generally accurate. In this case, the location service module might assign a linearly decreasing confidence level to the information over time so that at some point, it ceases to use the information or informs the user that the information cannot be guaranteed.

Location, Trust, and Timestamp

When the location providers provide their information to the location service module 602, the information can include, in addition to the confidence and accuracy parameters, the actual location information in a known format, a trust parameter and a timestamp. The trust parameter is a metric that is assigned by the location service module 602 to one or more of the location providers and defines the trust that the location service module has for the particular location provider. The timestamp is a metric that defines the time when the location information was provided by the location provider. This assists the location service module 602 in ascertaining whether information is stale and might need refreshed.

Once the location service module 602 has all of the location information, it can then set about determining the location of the device.

Figure 8:
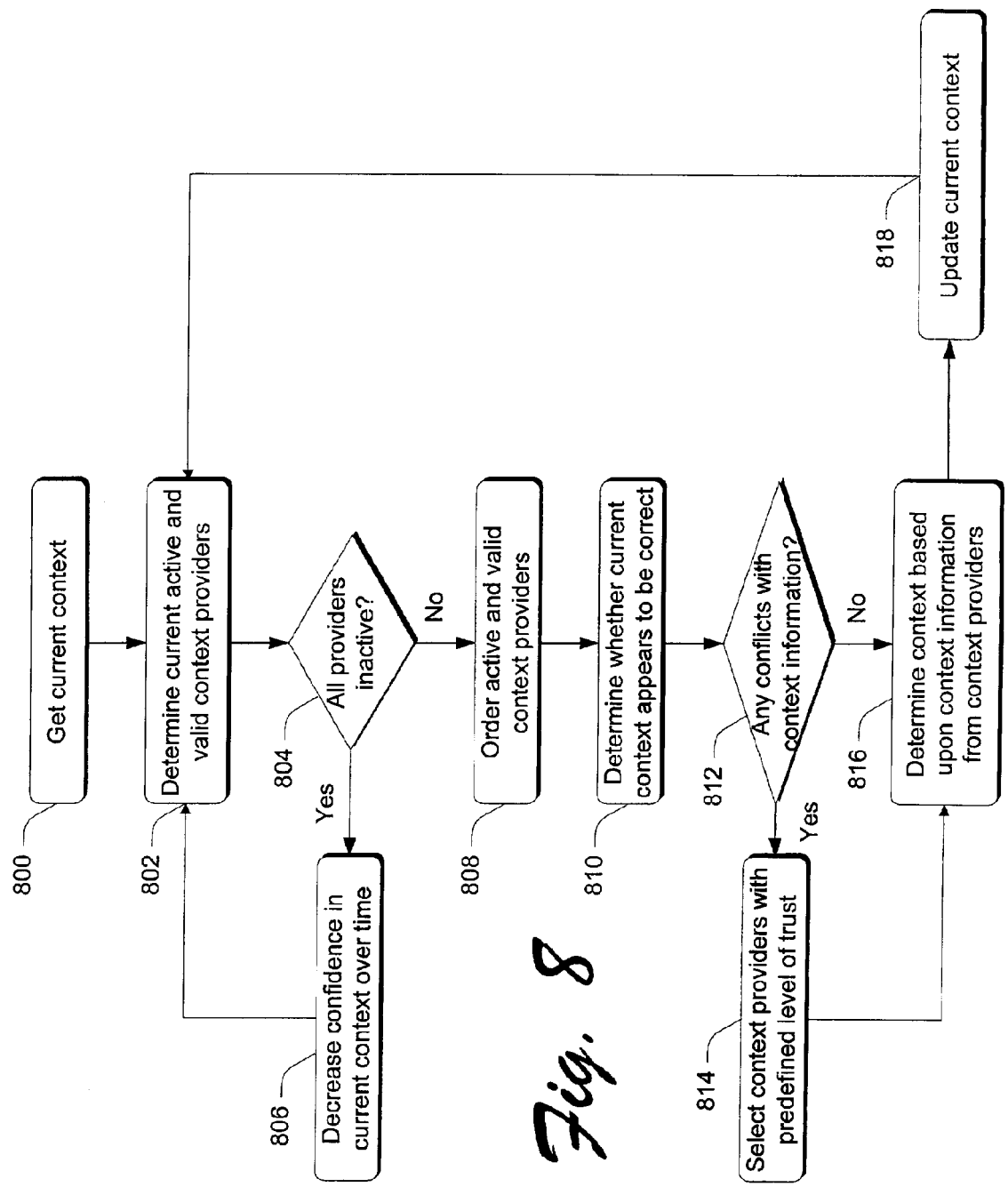
FIG. 8 is a flow diagram that describes steps in a method in accordance with the described embodiment.

FIG. 8 is a flow diagram that describes steps in a method of determining a device context which, in this example, is the device location. These steps are implemented by the location service module 602.

Step 800 gets the current device context. The current context can be the last calculated device context that is stored in the cache. Step 802 determines whether any of a number of context providers are available to provide context information. The location service module might do this by polling the context providers to ascertain which of the providers are active and valid. Step 804 determines whether all of the providers are inactive. If all of the providers are inactive, step 806 decreases the confidence in the current context over time and uses the current context as the device context. Step 802 then continues to monitor for current active and valid providers. If step 804 determines that one or more of the context providers are active, then step 808 orders the active and valid context providers. When the location service module 602 orders or sorts the context providers, it does so as a function of the confidence of the provider's information and/or the trust that the location service module has in the location provider. This provides a ranked list of the location providers. Step 810 checks to ascertain whether the context information appears to be correct. For example, where the context is the location of the device, the location service module 602 might know that five seconds ago the current location was Redmond, Wash. Accordingly, location information that indicates that the current location is Beijing, China would be incorrect. Step 812 then determines whether any of the context information conflicts with either the device's current context or the context information from other providers. For example, the location service module 602 can compare the context information from each of the context providers with the information in the cache. If any of the information conflicts with the cached information, then the information from that context provider can be discarded. Similarly, if context information varies inordinately as between the context providers, then step 814 can select the context providers having a predefined level of trust and perhaps use just their information (Step 816). If there are no conflicts, then step 816 determines the current context based upon the information that is provided by all of the context providers. In the described embodiment, this step is implemented by using the information to map to a particular node in one or more of the hierarchical tree structures mentioned above. For example, the location of the device can be ascertained by mapping the information to a particular node, and then completely traversing the tree structure until the root node is reached. Step 818 then updates the current context by perhaps writing it to the cache and returns to step 802 to determine the active and valid context providers.

The method described above provides a way for the location service module to receive location information and use only the location information that appears mostly likely to represent a current location. Conflicting information can be discounted or disregarded thereby assuring that only the most trusted, accurate and confident information is utilized to determine the device's current location.

Self Monitoring

In addition to the confidence and accuracy parameters, one or more of the location providers are advantageously programmed to self monitor their own operation for various irregularities that can occur. On the occurrence of an irregularity, the location providers are configured to notify the location service module 602. For example, the source from which the location provider receives its information may go off line for a period of time so that the location provider is unable to receive any additional information. In this case, the location provider might generate a "provider out" message and send it to the location service module 602. When the location service module 602 receives the "provider out" message, it can then take steps to exclude the location information from that provider from any location calculations that it performs. When the location provider's source comes back on line, it can generate a "provider on" message that informs the location service module 602 that it is able to transmit location information to the module. Of course, the location service module can be notified by the location providers on the occurrence of other operational irregularities, with the above example constituting but one specific case.

Applications

Once the location service module 602 has determined the device's location, it can receive queries from one or more applications 608. In the FIG. 7 example, the applications include a web site application, an Outlook application, and a service discovery application. In the present example, the web site application can be any web site application that is capable of rendering location-specific services. For example, the user of the device 602 might access Amazon-.com's web site to buy a favorite book. When the user purchases their book, Amazon.com must now compute the taxes that the user must pay. In this example, a script executing on Amazon.com's web site might query device 602 to learn of the user's location. In this particular example, the device might respond to the query by returning the state in which the user is making the purchase. Amazon.com can then assess the tax automatically. Amazon.com might also desire to know where the individual is located so that they can select an optimal shipping method (UPS or Express Mail). Depending on where the individual is located, one method may be preferred over the other. The Outlook application might query the location service module to ascertain the location because it (or the operating system, e.g. Windows) may change device settings based on the location of the computing device. For example, the user may print on one particular printer while at work, and another particular printer when at home. When the Outlook application determines that the user has gone home for the day, it can automatically change the device settings for the printer at the user's home. It might acquire the print settings from a personal places data store 714. Thus, the device is automatically configured for use depending on the user's location. The service discovery application might query the device to determine its location so that it can render a particular service depending on where the device is located. For example, if the user asks the application to locate the nearest color printer, the service discovery application might query the location service module to ascertain the device's current location so that it can use this information and find the nearest color printer. Consider also that the Outlook application could configure itself email to a work location (when an individual is at work) or to a home location (when an individual is at home). In addition, the Outlook calendar can become location aware, e.g. when you change time zones, your appointments would show up in the proper time slots.

As one can imagine, the possibilities are seemingly endless. This functionality is made possible through the use of the Master World and one or more Secondary Worlds.

Application Program Interface/Events

In the described embodiment, the applications 608 communicate with the location service module 602 through one or more application program interfaces (APIs) and/or events. The applications can make function calls on the API to query the location service module as to its current location. Similarly, the applications can register for location notifications by using an events registration process. For example, an application may register for a notification when the user changes their location. Consider the case where an application requests to be notified when the user arrives at work or at home so that the application can change the device's configuration (such as printer configuration).

Figure 9:
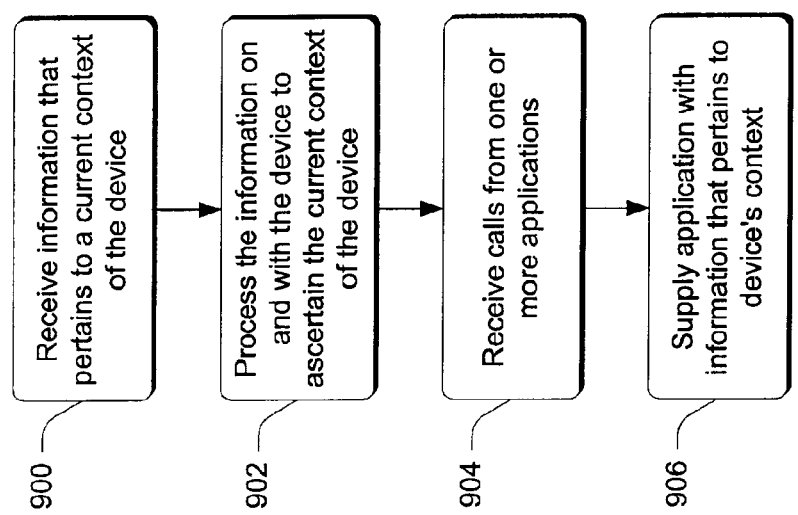
FIG. 9 is a flow diagram that describes steps in a method in accordance with the described embodiment.

FIG. 9 is a flow diagram that describes steps in a method in accordance with the described embodiment. The steps that are described are implemented by device 600. Step 900 receives information that pertains to the current context of the device. In this particular example, a portion of the information is received from one or more context providers which, in this case, are location providers. Step 902 processes the information on and with the device to ascertain the current context of the device. In the illustrated example, the device maintains (or has access to) one or more of the Master World and one or more Secondary Worlds. When the device receives all of the location information, it maps the information to a particular node in the hierarchical tree structure that defines the Worlds. It then traverses the tree structures to ascertain the complete context (i.e. location) of the device. Step 904 receives calls from one or more applications that request information that pertains to the device's current context or location. In the illustrated example, the applications can call one or more APIs to request the information or the applications can register for event notifications. Step 906 then supplies the applications with at least some information that pertains to the current device location. As will be discussed below, a security policy or privacy policy can be applied to the information before it is returned to the applications.

Privacy Manager

In one embodiment, a privacy manager 704 (FIG. 7) is provided. Although the privacy manager is illustrated as being incorporated on the device, it could be implemented by a trusted entity such as a trusted server that is not part of the mobile computing device. The privacy manager can be implemented in any suitable hardware, software, firmware or combination thereof. In the illustrated example, the privacy manager comprises a software module that is incorporated in the mobile computing device.

The privacy manager 704 addresses privacy concerns that are associated with the information that is collected by the computing device. Specifically, the location service module can calculate detailed information regarding the location of the computing device. It may be desirable, in some instances, to filter the information that is provided to various applications. That is, it is entirely likely that a user may not want their specific location information provided to untrusted applications. In these instances a user might just desire for location service module 602 to inform such applications that the user is in the State of Washington.

Figure 10:
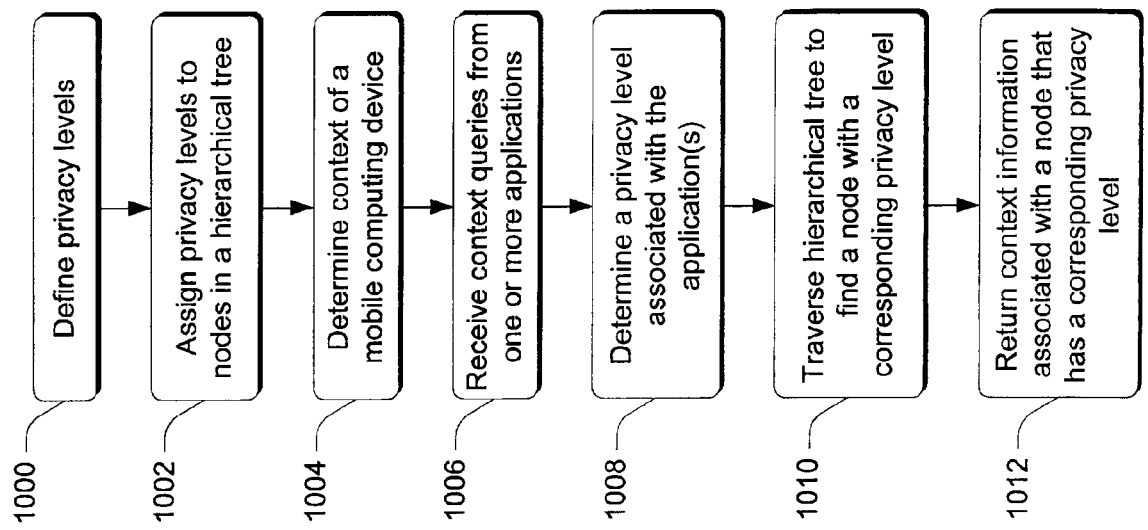
FIG. 10 is a flow diagram that describes steps in a method in accordance with the described embodiment.

FIG. 10 shows a flow diagram that describes steps in a privacy protection method in accordance with the described embodiment. These steps can be implemented by the privacy manager 704.

Step 1000 defines a plurality of privacy levels. Exemplary privacy levels are set forth in the table immediately below:

| Privacy Level | Approximate Scale | Level of Revelation |
|---|---|---|
| 0 | — | No location information is returned |
| 10 | 100,000 Km | Planet/Continent |
| 20 | 1,000 Km | Country |
| 30 | 100 Km | State |
| 40 | 10–100 Km | City & County or Region |
| 50 | 10 Km | Postal Code & Phone Area Code |
| 60 | 1 Km | Full Postal Code (Zip + 4) & Area Code and Exchange |
| 70 | 100 m | Phone Number & Building/Floor |
| 80 | 10 m | Room # |
| 90 | 1 m | Exact Coordinates |

In the illustrated table, 10 different privacy levels are defined and each has an associated approximate scale. For example, a privacy level of 0 means that no location information is returned. A privacy level of 90 means that very detailed location information is returned.

Step 1002 assigns various privacy levels to the individual nodes in one or more hierarchical tree structures. For example, each node of the Master World and the Secondary Worlds can have a privacy level associated with it. The root node of the Master World tree structure might have a privacy level of 10, while the node that represents a current location in a Secondary World might have a privacy level of 90. Step 1004 determines the context of the computing device. In the present example, the context is the device location and examples of how this is done are given above. Individual applications that call the location service module can have privacy levels associated with them. These privacy levels can be assigned by individual users. For example, a trusted application might have a privacy level of 90, while an untrusted application might have a privacy level of 30. Step 1006 receives context queries from one or more applications. Here, an application calls the location service module 602 (FIG. 7) to ascertain the location of the device. Step 1008 determines the privacy level associated with the application or applications. For example, if a untrusted application calls to request location information, the privacy manager 704 would determine that the application has a privacy level of 30. The privacy manager then traverses (step 1010) one or more hierarchical tree structures to find a node with a corresponding privacy level so that it can select the information that is associated with that node. In this example, the traversal might involve jumping from the Secondary World to the Master World to find the node that corresponds to the state in which the user is located. Once the corresponding node is found, step 1012 returns the context information (e.g. location information) associated with the node. In this case, the location service module would inform the application that the user's location is the State of Washington.

As an example, consider the following: There is a web site that gives up to the minute weather of various locations. Accordingly, you might assign this web site a privacy level of 60 so that you can receive weather information for the geographical area that corresponds to your present full postal code. Another web site might be a corporation intranet web site that is a trusted web site. Thus, any applications associated with this web site can be assigned a privacy level of 90 so that you can give them precise location information as to your whereabouts.

Thus, in the present example, the computing device is able to determine the source (i.e. application) of its queries and modulate the information that is returned to the application as a function of the application's identity. The computing device is able to do this because it has access to the Master World and one or more Secondary Worlds. The above description constitutes but one exemplary way of accomplishing this feat.

Location Beacons as a Location Provider

In one embodiment, one of the location providers comprises a location beacon that beacons or transmits information to enable a computing device to actively participate in its current context. Location beacons can comprise standalone devices that can be retrofitted onto existing infrastructures, e.g. a smoke detector or wall outlet in order for the device to have a power source.

Figure 11:
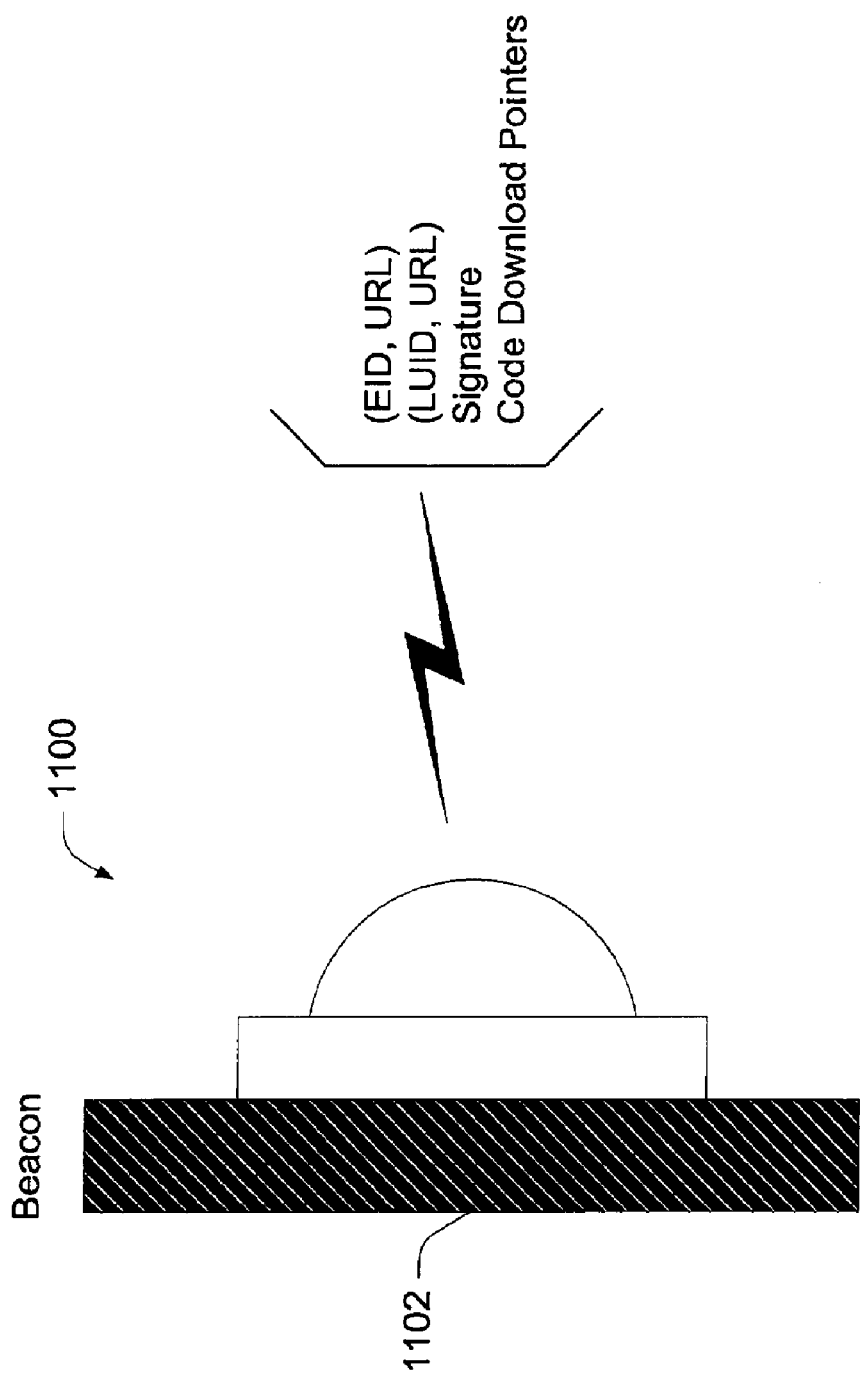
FIG. 11 is a side elevational view of an exemplary location beacon in accordance with one embodiment.

FIG. 11 shows an exemplary beacon 1100 that is mounted on a structure 1102. Structure 1102 can be any suitable structure such as a wall in a conference room or public place, a smoke detector, an electrical socket and the like. In the described embodiment, the location beacons are small inexpensive devices that can be permanently mounted in special locations such as conference rooms, building lobbies, airport gates, public places and the like. The beacons announce the physical location in the form of an EID and/or LUID to all mobile devices that are within range, such as laptops, tablet PCs, hand held computers, mobile phones, wearable computers and the like.

In the described embodiment, the location beacon can identify the particular locations by beaconing standard information that will be understood by the mobile computing devices. In the present example, the beacons can transmit one or two location identifier pairs comprising an EID/URL pair and a LUID/URL pair. The beacon might also transmit multiple LUIDs. The EID and LUID give the present node location in the Master World and Secondary World respectively. The URLs provide a reachable location for the Master and Secondary Worlds. For example, the URL associated with the Secondary World can give a service location that the device can use to query information about the Secondary World so that it can derive its context and take advantage of resources or services that are associated with the nodes in the Secondary World.

The beacons can also transmit a digital signature that can be used by the device to ascertain that the beacon is valid and legitimate. Any suitable signature or verification method could be used. In addition, and of particular use in the context-aware environment, the beacon can be programmed to transmit code download pointers to devices within range. The code download pointers can enable the computing device to access software code that permits them to interact with their environment. Consider the following example: You walk into a conference room with your cell phone computing device and immediately a beacon in the conference room transmits your location in the form of an EID/URL pair and a LUID/URL pair. Your device uses the information pairs to ascertain its location in the Master and Secondary Worlds as described above. The beacon also transmits a code download pointer that points to software code that enables you to operate the video projector in the conference room using your hand-held cellular phone. In this manner, the beacon serves as more than just a location beacon—it permits you, through your computing device, to actively participate in your surroundings.

The beacons can transmit the information in any suitable way, e.g. wireless methods including infrared and radio frequencies. In one embodiment, Bluetooth short range radio frequency communication can be used to provide a low cost, low power alternative.

Context-Aware Vehicle

Figure 12:
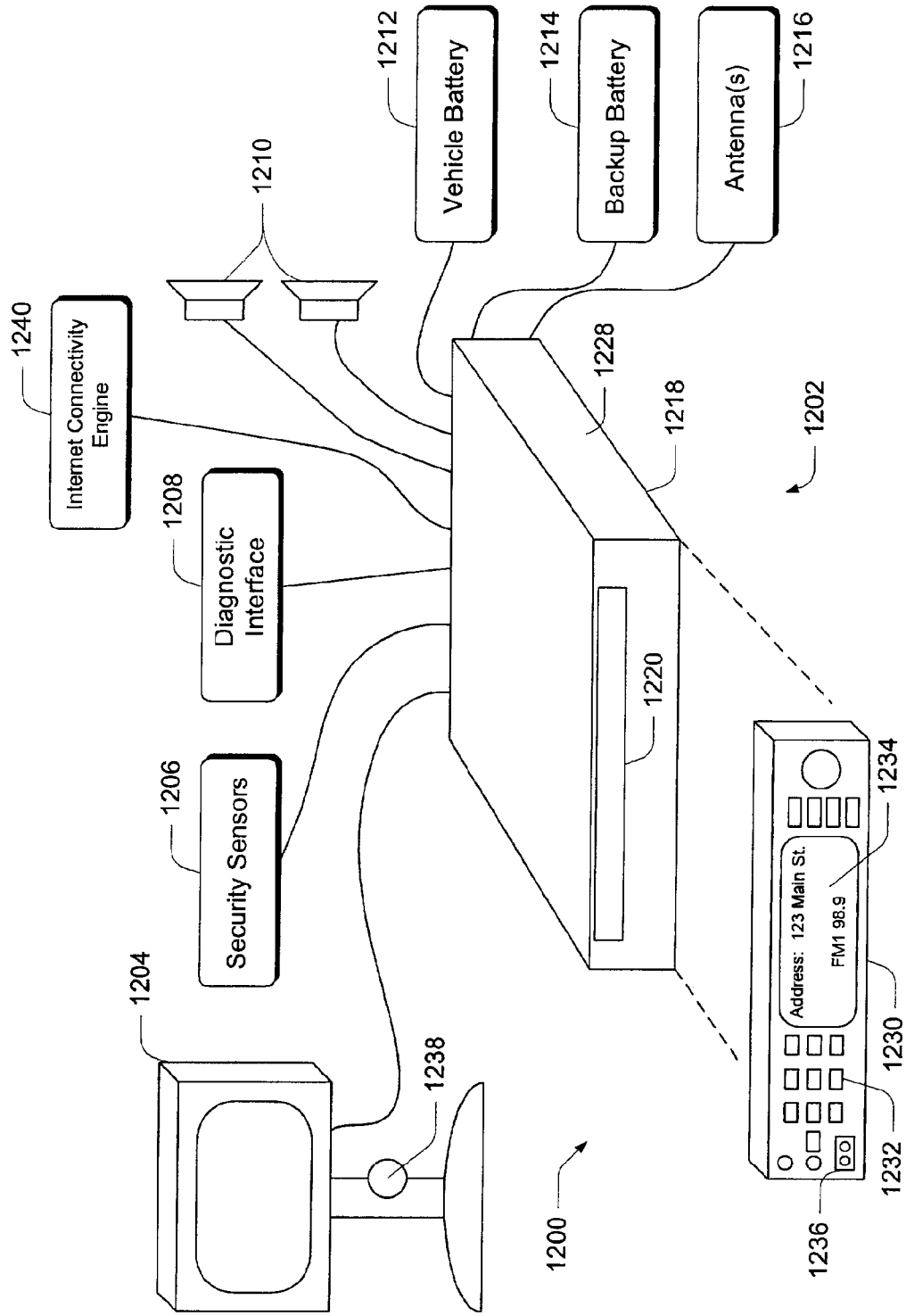
FIG. 12 is a diagram of a vehicle computer in accordance with one described embodiment.

FIG. 12 shows an exemplary vehicle (e.g., automobile) computer system 1200 that can be used in connection with the context-aware systems and methods described above and below. System 1200 is configured for use in a vehicle such as a car, truck or other similar conveyance. When in place in a vehicle, computer system 1200 can provide a multitude of context-aware services as will become apparent below.

Vehicle computer system 1200 has a centralized computer 1202 coupled to various external peripheral devices, including a display device 1204, security sensors 1206, a vehicle diagnostic interface 1208, speakers 1210, a vehicle battery 1212, a backup battery 1214, and antenna(s) 1216. The computer 1202 is assembled in a housing 1218 that is sized to be mounted in a vehicle dashboard, similar to a conventional automobile stereo. In the illustrated example, the housing 1218 has a form factor of a single DIN (Deutsche Industry Normen). Alternatively, it could be housed in a 2 DIN unit or other special form factor for an OEM.

The computer 1202 runs an open platform operating system which supports multiple applications. Using an open platform operating system and an open computer system architecture, various software applications and hardware peripherals can be produced by independent vendors and subsequently installed by the vehicle user after purchase of the vehicle. This is advantageous in that the software applications do not need to be specially configured for uniquely designed embedded systems. In the illustrated example the open hardware architecture runs a multitasking operating system that employs a graphical user interface. A multitasking operating system allows simultaneous execution of multiple applications. One such operating system is the "Windows" brand of operating systems (e.g., the "Windows CE" operating system) sold by Microsoft Corporation of Redmond, Wash.

The computer 1202 can include at least one storage drive which permits the vehicle user to download programs and data from a storage medium. In the illustrated implementation, the computer 1202 has a CD ROM (or other optical) drive 1220 which reads application-related CDs, as well as musical, video, game, or other types of entertainment CDs. The computer 1202 may also include other storage devices, such as a magnetic disk drive, smart card reader, PCMCIA card sockets, a hard disk drive, or a DVD ("digital video disk" or "digital versatile disk") drive.

The storage drives are mounted in a base unit 1228 of the housing 1218. The base unit 1228 is constructed and sized to be mounted in the dashboard. Optionally, this base unit may be removable in the same fashion as a laptop computer and its associated docking station. This option allows the user to take the vehicle computer to his/her home or office to serve as his/her portable PC. The housing 1218 also has a faceplate 1230 which is pivotally mounted to the front of the base unit 1228 and may optionally be detachable. The faceplate can be rotated to permit easy and convenient access to the storage drives.

The computer 1202 has a keypad 1232 and a display 1234 on the faceplate 1230. The operating system executing on the computer 1202 controls the faceplate peripheral, which, through the faceplate processor, can control the faceplate keys 1232 and the faceplate display 1234 as peripheral devices when the faceplate is attached to the base unit. Additionally, the computer 1202 has a voice recognition device to permit the user to verbally enter commands in a hands-free, eyes-free environment. These voice commands can be used for controlling most operating modes of the vehicle computing platform. The computer 1202 is also equipped with an IrDA (infrared developers association) transceiver port 1236 mounted on the faceplate 1230 to transmit and receive data and programs using infrared signals. The entire faceplate unit 1230 behaves as a multi-function peripheral to the computing platform.

The computer 1202 can output visual data to the LCD 1234 at the faceplate, or to the display device 1204. In the exemplary illustration, display 1234 is a back lit LCD and display 1204 is a small flat panel display (e.g., 6.4" screen) that is movably mounted on a stand or yoke and remotely located from the computer. Additional display devices may also be added that are similar to display 1204 or 1234. Different types of display devices may also be added, such as a Heads Up Display (HUD).

The display 1204 is fully adjustable to different viewing positions that can be seen by the driver or other passengers in the vehicle. The type of data displayed can range widely from word instructions concerning the vehicle's performance, to diagrammatic directions from a navigation system, to video movies for in-car entertainment. The display 1204 can be equipped with an automatic override switch 1238 which automatically disables the display of any non-driving related data when positioned to be viewed by the driver. When facing the driver, only information supportive and helpful to driving (e.g., diagnostics, navigation directions) is displayed on the monitor, while distracting information (e.g., video movies, games) is blocked from display. In one implementation, the switch is an electrical cylindrical switch which closes when the display is capable of being viewed by the driver; thus, the software can sense the display position and only allow permitted information to be displayed.

In general, the vehicle computer system 1200 can be used to integrate multiple vehicle-related systems onto one open platform hardware and software architecture. For instance, the vehicle computer system 1200 can serve as a multimedia entertainment system, a navigation system, a communications system, a security system, and a diagnostics system. Moreover, the vehicle computer system 1200 provides additional functionality traditionally associated with desk-top and laptop personal computers. For instance, vehicle computer system 1200 can support word processing applications, spreadsheet applications, database applications, web browser applications, and appointment/schedule applications. Furthermore, the vehicle computer system 1200 can be configured to operate as a server to other computing units in the vehicle to distribute games, video movies, and the like to passengers. Furthermore, the system includes an internet connectivity engine 1240 that is configured to establish connectivity with the Internet. This can be done in any suitable way. For example, the internet connectivity engine 1240 can wirelessly establish connectivity with the Internet through known wireless techniques.

In accordance with the described embodiment, information can be displayed on either display device 1204 or display 1234. The information can be provided by an application running on computer 1202, or by a device external to computer 1202, such as sensors 1206 or via diagnostic interface 1208, antenna 1216, IrDA port 1236, etc. Such information can also be provided to the computer via the internet connectivity engine 1240. Information that can be displayed includes any type of data or control information. Additionally, information to be displayed can include a "caption" or "label" that describes the data. Examples of data that can be displayed include street addresses, phone numbers, and directions (e.g., "Turn Left At Light On Main Street"). Such data can be displayed either including a caption describing the data (e.g., "Address: 12345 Washington Street", where "Address:" is the caption portion of the information) or without a caption (e.g., "12345 Washington Street"). Examples of control information include toolbars, menu options, and user-selectable on-screen regions (such as buttons), as well as instructions, headings, and other descriptive information.

In the discussion herein, the various embodiments are described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the described embodiments can be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 13:
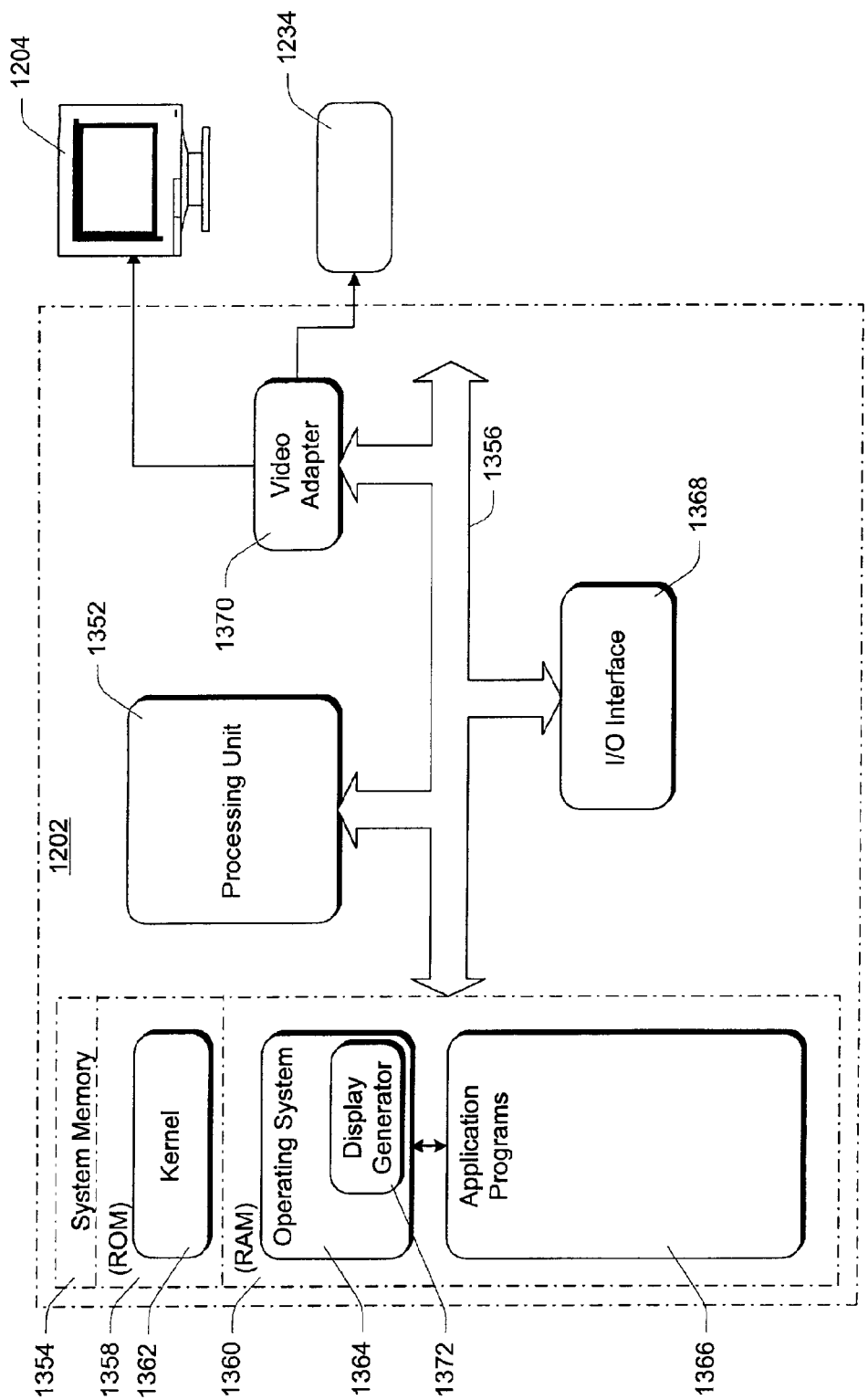
FIG. 13 is a more detailed view of portions of the FIG. 12 vehicle computer.

FIG. 13 shows exemplary components of computer 1202 of FIG. 12 in more detail. Computer 1202 includes one or more processors or processing units 1352, a system memory 1354, and a bus 1356 that couples various system components including the system memory 1354 to processors 1352.

The bus 1356 represents one or more of any of several types of bus structures, including a memory bus or memory controller, a peripheral bus, an accelerated graphics port, and a processor or local bus using any of a variety of bus architectures. The system memory 1354 includes read only memory (ROM) 1358 and random access memory (RAM) 1360. A portion of the operating system, such as kernel 1362, contains the basic routines that help to transfer information between elements within computer 1202, such as during start-up, is stored in ROM 1358.

A number of program modules can be stored in ROM 1358 or RAM 1360, including an operating system 1364 and one or more application programs 1366. A user may enter commands and information into computer 1202 through various input devices, such as a keyboard (e.g., keypad 1232 of FIG. 12), touchscreen, pointing device, microphone, joystick, game pad, satellite dish, scanner, or the like (not shown in FIG. 13). These and other input devices are coupled to the processing unit 1352 through an input/output (I/O) interface 1368 that is coupled to the bus 1356. A display 1204 or 1234, or other type of display device, is also connected to the bus 1356 via an interface, such as a video adapter(s) 1370. Data to be displayed on display 1204 or 1234 is provided to adapter 1370 by a display generator 1372 of operating system 1364. In addition to the display, computers can include other peripheral output devices (not shown in FIG. 13) such as speakers and printers that are coupled to the processing unit 1352 through I/O interface 1368.

Generally, the processors of computer 1202 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory.

For example, the above-described context and location service can be stored in this manner so as to permit the computer to make full use of the context-aware (location-aware) applications described above and below.

The embodiments described herein include these and other various types of computer-readable storage media when such media contain instructions or programs for implementing the steps described below in conjunction with a microprocessor or other data processor. The described embodiments also include the computer itself when programmed according to the methods and techniques described below. Furthermore, certain sub-components of the computer may be programmed to perform the functions and steps described below. The described embodiments include such sub-components when they are programmed as described. In addition, the described embodiments include data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Context-based Architecture

Figure 14:
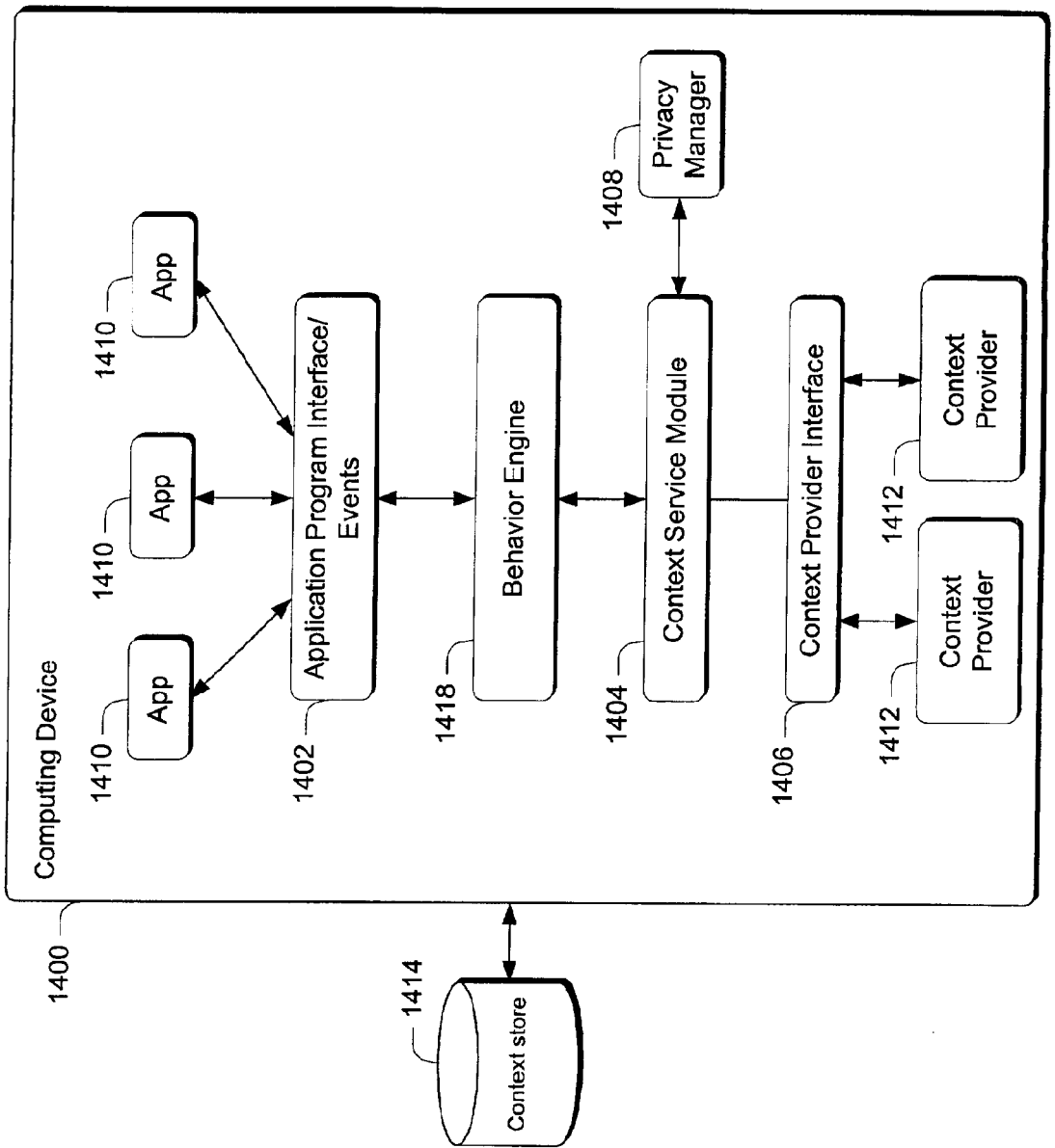
FIG. 14 is a block diagram of an exemplary context-aware system in accordance with one described embodiment.

FIG. 14 shows an exemplary architecture 1400 that can be utilized to implement a context-aware vehicle. Some of the components of the architecture are similar to or the same as components that have already been discussed above. To this extent, these components are not described in additional detail here. These components include an application program interface/events component 1402, context service module 1404, context provider interface 1406, and privacy manager 1408.

Additional components that are germane to this discussion include one or more applications 1410 that are executable on the vehicle's computer, one or more context providers 1412, a context data store 1414, and a behavior engine 1418.

Applications 1410 can include any suitable applications that are capable of being executed in connection with a vehicle such as an automobile. Exemplary applications can include those that are used to implement or be used in connection with audio/visual equipment or peripheral devices such as the radio, entertainment devices, visual displays, temperature regulation devices, and various controllers that can be associated with equipment on the vehicle, to name just a few.

The context providers 1412 can be any suitable context providers that are capable of providing context information, via the context provider interface 1406 and context service module 1404, to the behavior engine 1418. Context providers can include such things as environmental sensors (e.g. light, heat, smog and the like). It will be appreciated that although the context providers are shown as being on the computing device itself (i.e. located on the vehicle), the context providers can be located off of the vehicle. For example, context providers can broadcast wireless context information for receipt by the computing device.

Context store 1414 can store per-user context preferences that are available locally and/or it can cache per-user context preferences that are present somewhere outside the vehicle. This store can also be used to store context preference information that is common to all users (per-vehicle). This store can also be used to temporarily store all the context data that is being provided by the various context providers. This way, the behavior engine can act on this data at a later time, rather than instantaneously. In addition, the store can hold per-vehicle data. User-specific context information can pertain to any suitable type of context information. As an example, the user might provide their preferences for seat settings, vehicle temperature, vehicle interior lighting, radio volume and the like. These preferences can be maintained on the vehicle in a vehicle store, or externally of the vehicle in, for example, a network accessible data store (e.g. a data store accessible via a Web server).

Behavior engine 1418 comprises a software module that receives context information from one or more sources and manipulates in some way or causes the behavior of the vehicle to be manipulated. Manipulation of the vehicle's behavior can manifest itself, in the illustrated example, through settings or other parameters that are passed from the behavior engine 1418 to one or more applications 1410 and that affect the behavior of the vehicle. The settings or parameters thus cause the application to function, in some way, in a manner that is unique to the context in which the vehicle is determined to be.

As an example consider the following: A vehicle is traveling on a long trip that started early in the morning. As dusk approaches, a context provider 1412 in the form of a light sensor provides information to the context service module 1404 which, in turn, ascertains that outside lighting conditions are sufficient to require the headlights to be turned on. Accordingly, the behavior engine 1418 causes the application associated with the headlights to turn the headlights on. In this specific example, the behavior engine can also cause the application associated with the driver's display to change the light contrast setting so that the driver can more easily view the display. This solution, as well as the other solutions described below, can be advantageously implemented in software so that the necessity of building any hardwired hardware solutions is eliminated.

As another example, consider the following: While traveling in a context-aware vehicle, the vehicle enters an area where there is a large amount of smog. A context provider in the form of a smog sensor provides information to the context service modules which, in turn, determines that smoggy conditions exist. As a result, the behavior engine 1418 causes the application 1410 associated with the vehicle's ventilation system to automatically shut off the outside supply of air.

Figure 15:
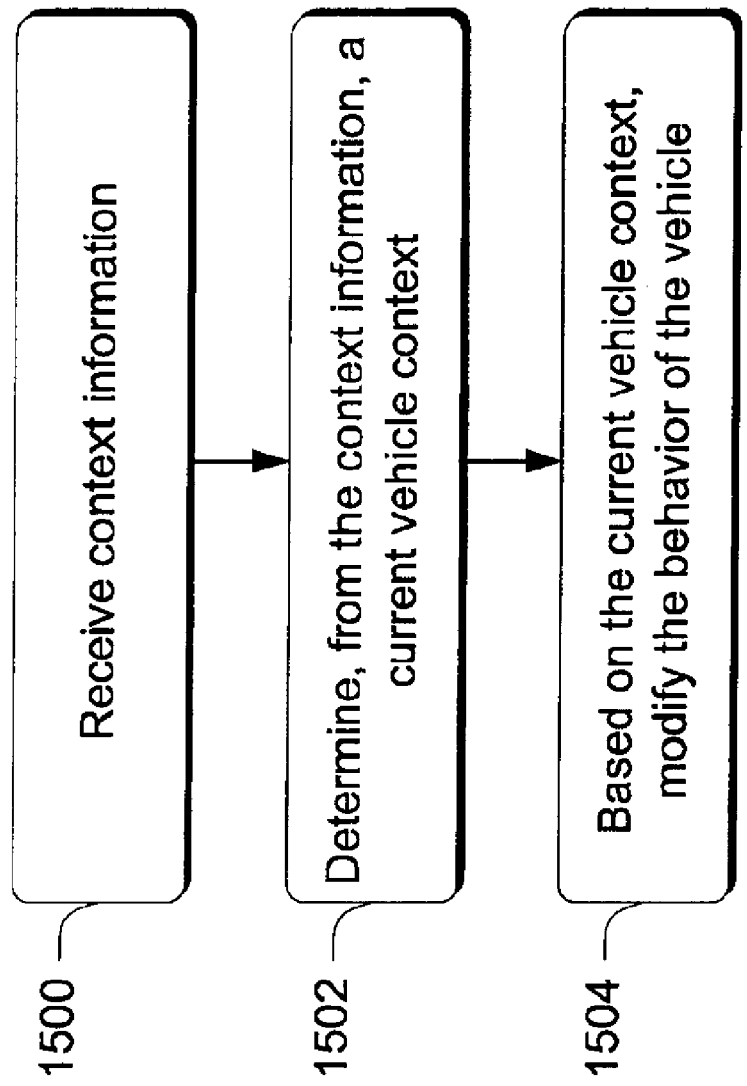
FIG. 15 is a flow diagram that describes steps in a method in accordance with one described embodiment.

FIG. 15 is a flow diagram that describes steps in a method in accordance with the described embodiment. The method can be implemented in any suitable hardware, software, firmware, or combination thereof. In the illustrated example, the method is implemented in software. In a specific implementation, this method can be implemented in connection with the architecture shown in FIG. 14.

Step 1500 receives context information. This information can comprise any suitable type of information and can be received in any suitable way. For example, the context information can comprise user-specific information. This user-specific information can be received from a user who physically enters the information into the vehicle's computer. Alternately, the user-specific information can be retrieved from a data store, either onboard or remote from the vehicle. If the information is onboard the vehicle, the information can simply be retrieved from whatever data store holds the information. If the information is maintained remote from the vehicle (e.g. in a Web-accessible data store), the information can then be retrieved in any suitable way such as via a wireless connection with the Web that is then used to access the remote data store and retrieve the information.

The context information can also comprise information associated with the vehicle's operating environment and can be gleaned from various different sensors that can be provided on the vehicle. Examples of this are given above.

Step 1502 determines, from the context information, a current vehicle context. This step can be implemented by a context service module such as module 1404 in FIG. 14. The current context can be determined by ascertaining the current vehicle user. The current context can also be determined by making a decision, based upon the context information, about the likely context of the vehicle. For example, if the context information suggests that it is likely dark outside of the vehicle, a decision concerning the current context can be made with an ascertainable degree of certainty. Based on the current vehicle context, the behavior of the vehicle can then be modified in some way or manner that is consistent with the vehicle's current context (step 1504). This step can be implemented by a behavior engine such as engine 1418 in FIG. 14. The behavior engine receives information from the context service module 1404 indicating the current vehicle context. Based on this, the behavior engine can cause settings or other parameters to be passed to applications associated with the context so that the applications can modify the behavior of the vehicle in some way.

Exemplary Location-Based Architecture

Figure 16:
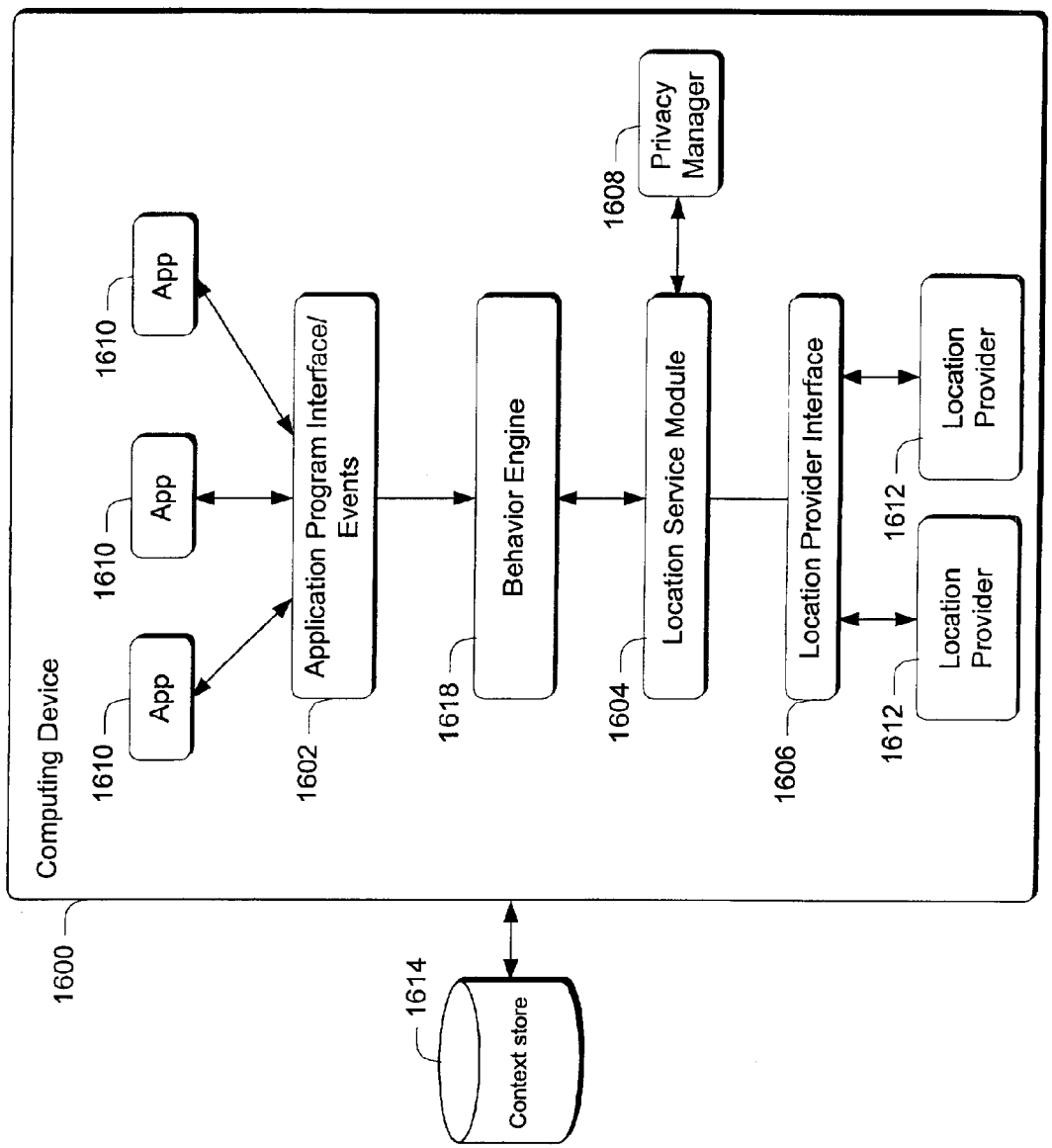
FIG. 16 is a block diagram of an exemplary location-aware system in accordance with one described embodiment.

FIG. 16 shows an exemplary architecture 1600 that can be utilized to implement a location-aware vehicle. Some of the components of the architecture are similar to or the same as components that have already been discussed above. To this extent, these components are not described in additional detail here. These components include an application program interface/events component 1602, location service module 1604, location provider interface 1606, and privacy manager 1608.

Additional components that are germane to this discussion include one or more applications 1610 that are executable on the vehicle's computer or on the vehicle itself, one or more location providers 1612, a context store 1614, and a behavior engine 1618.

Applications 1610 can include any suitable applications that are capable of being executed in connection with a vehicle such as an automobile. Exemplary applications can include those that are used to implement or be used in connection with a location-sensitive service. For example, one application can comprise an Internet connectivity application that establishes an Internet connection via a local ISP. For example, the Internet connectivity engine 1240 (FIG. 12) can call a toll free telephone number to get a list of affiliated ISPs and a set of <location, phone number> pairs. This list can also be pre-installed in the vehicle's computer, or downloaded periodically via that Internet. When the user tries to access the Internet, the Internet connectivity engine 1240 calls the location service module 1604 to ascertain the current location. Based on the current location, the Internet connectivity engine 1240 selects an access number that is local to the area in which the vehicle is located. As the vehicle moves between locations, the Internet connectivity engine 1240 can get location updates and update its local access number. Another application can control the radio and its various settings, as will be discussed in more detail below in the section entitled "Radio Station Settings".

The location providers 1612 can be any suitable location providers that are capable of providing location information, via the location provider interface 1606 and location service module 1604, to the behavior engine 1618. Exemplary location providers are discussed above. In vehicle-based applications, however, one source of location information comprises a GPS source that provides GPS information to an onboard location provider.

Context store 1614 can store per-user location preferences that are available locally and/or it can cache per-user location preferences that are present somewhere outside the vehicle. This store can also be used to store location preference information that is common to all users (per-vehicle). This store can also be used to temporarily store all the location data that is being provided by the various location providers. This way, the behavior engine can act on this data at a later time, rather than instantaneously. In accordance with the described embodiment, users can provide user-specific location information that is maintained in store 1614. This user-specific location information can pertain to any suitable type of location information. As an example, and one that is explored in more detail below, a user might enter their favorite radio stations for several different cities that they travel to often. These preferences can be maintained and, when the location service determines the location of the user's vehicle to be one of the subject cities, the behavior engine 1618 causes the application that is associated with the station controller to automatically program the radio stations for the new city.

Behavioral engine 1618 comprises a software module that receives location information from one or more sources and manipulates in some way the behavior of the vehicle. Manipulation of the vehicle's behavior can manifest itself, in the illustrated example, through settings or other parameters that are passed from the behavior engine to one or more applications 1610. The settings or parameters thus cause the application to function, in some way, in a manner that is unique to the location in which the vehicle is determined to be.

FIG. 17 is a flow diagram that describes steps in a method in accordance with the described embodiment. The method can be implemented in any suitable hardware, software, firmware, or combination thereof. In the illustrated example, the method is implemented in software. In a specific implementation, this method can be implemented in connection with the architecture shown in FIG. 16.

Step 1700 receives location information. This information can comprise any suitable type of information and can be received in any suitable way. For is example, the location information can comprise user-specific information. This user-specific information can be received from a user who physically enters the information. Alternately, the user-specific information can be retrieved from a data store, either onboard or remote from the vehicle. If the information is onboard the vehicle, the information can simply be retrieved from whatever data store holds the information. If the information is maintained remote from the vehicle (e.g. in a Web-accessible data store), the information can then be retrieved in any suitable way such as via a wireless connection with the Web.

Step 1702 determines, from the location information, a current vehicle location. This step can be implemented by a location service module such as module 1604 in FIG. 16. Based on the current vehicle location, the behavior of the vehicle is modified in some way (step 1704). This step can be implemented by a behavior engine such as engine 1618 in FIG. 16. The behavior engine receives information from the location service module 1604 indicating the current vehicle location. Based on this, the behavior engine can cause settings or other parameters to be passed to applications associated with the location so that the applications can modify the behavior of the vehicle in some way.

Radio Station Settings

In one embodiment, a user can specify radio stations and locations associated with those radio stations. Based on the location of the vehicle, the user-specified radio stations for the particular radio stations are mapped automatically to the buttons of the radio when the vehicle's location coincides with a location specified by the user. As an example, consider the following: Assume that 950 AM is the all-sports radio channel in Seattle and 880 AM is the all-sports radio channel in Portland. Further assume that the user has specified that button #1 of the radio is to be associated with 950 AM when his vehicle is located in Seattle and 880 AM when his vehicle is located in Portland. These user specifications are referred to as the user's preferences. The user's preferences are stored in an accessible location such as a per-user location store 1614. Assume now that the user has to travel from Portland to Seattle on business. When the location service on board the user's vehicle ascertains that the vehicle's location is Seattle, the behavior engine 1618 causes the application associated with the radio station controller to map Seattle station 950 to button #1 of the radio. This happens automatically without the need for any user intervention.

FIG. 18 is a flow diagram that describes steps in a method in accordance with one described embodiment. The method can be implemented in any suitable hardware, software, firmware, or combination thereof. In the described embodiment, the method is implemented in software. Suitable software is described above in connection with FIGS. 16 and 17.

Step 1800 associates one or more radio stations with one or more locations. This step can be implemented by a user establishing such an association by inputting their preferences into the vehicle's computer. This step can also be implemented by a user storing their preferences in some other location that is accessible by the vehicle's computer (e.g. a Web-accessible location). The preferences are then stored in a per-user location store such as the one described above. The store can either be onboard a vehicle or remote from the vehicle. If the store is remote from the vehicle, then the vehicle's computer can establish a suitable connection, for example via the Internet, and fetch the user's preferences. Step 1802 determines the location of the vehicle. Any suitable method or technique can be used to determine the vehicle's location. In this specific example, a location service, implemented in software, can be used. Recall that the location service discussed in this document makes use of hierarchical tree structures in the form of Primary and Secondary Worlds that permit the location service to ascertain its location based upon input from one or more location providers. Once the location is determined, radio stations that are associated with that location are mapped (step 1804) to radio station buttons on the vehicle's radio. This step is implemented, in the present example, through the interaction between the behavior engine 1618 and an appropriate application 1610 that manages the mapping of the radio stations. Once the mapping has taken place, the user is free to select from among the station that they previously specified. Step 1806 then determines whether the vehicle is at a new location. If so, the method determines the new location through the use of the location service and then branches to step 1804 to map any new stations associated with the new location to the radio's buttons. If there is no new location, the method does nothing and simply returns to step 1806.

The embodiment described immediately above provides a system and methodology by which a user can make radio station preferences for different locations known to the user. These known preferences are then enforced automatically as a function of a vehicle's location.

In certain circumstances, however, individuals may be unaware of the specific radio stations in all of the potential locations to which they may travel that play the type of music or content to which they desire to listen. For example, an individual may not know the specific radio stations in Fresno, San Francisco, Sacramento, and San Diego that play the type of music that they prefer. Accordingly, one embodiment allows the user to associate each of the radio buttons with a radio station type. Exemplary radio station types include, without limitation, those that play light rock, heavy metal, all-news, all-sports, classical, talk shows and the like. The vehicle's computer maintains or has access to a list that associates radio station types, location, and radio station frequency (i.e. station number). This list can be resident on the vehicle's computer, or can be periodically downloaded from the Internet. Now, when a user travels from location to location, the location service determines the vehicle's location as described above, and notifies the vehicle's behavior engine. The behavior engine then causes the appropriate application that manages the radio station selections to map the new radio station frequencies (or settings) to appropriate buttons on the vehicle's radio. In this way, a user need simply specify radio station types and need not know specific radio station settings.

FIG. 19 is a flow diagram that describes steps in a method in accordance with one described embodiment. The method can be implemented in any suitable hardware, software, firmware, or combination thereof. In the described embodiment, the method is implemented in software. Suitable software is described above in connection with FIGS. 16 and 17.

Step 1900 associates at least one radio station type with a radio button. This step can be implemented by a user specifying their associations or preferences. For example, hard rock can be associated with button #1, soft rock with button #2, and so on. These associations or preferences are then either maintained by or accessible to the vehicle's computer. Step 1902 determines the vehicle's location. This step can be implemented as described above. Step 1904 maps, for a given location, each radio station frequency for a radio station type to a radio station button. So, for example, as a user drives from San Francisco to San Diego, their preferences for radio station types (i.e. classical, rock, sports and the like) are automatically and seamlessly made available to the user via the radio buttons.

Location-based Information

In another embodiment, the location of a vehicle is utilized as the basis to provide the driver with information that can be of interest to them. Specifically, the location service onboard the vehicle determines the vehicle's location as set forth above. Once the location of the vehicle is ascertained, various information associated with or pertaining to that location or locations nearby can be presented to the driver. This information can be any information that might be of interest to the driver. For example, such information can include, without limitation, upcoming weather, traffic reports, rest stops, suggestions regarding food, gas stations, scenic viewpoints and the like. As an example, consider the following: A user indicates in their preferences that they prefer to fill their car with gas from Texaco stations only. While traveling on a trip, the location service determines the vehicle's location. In conjunction with determining the vehicle's location, an application executing on the vehicle's computer informs the driver that there are 3 Texaco stations within the next 100 miles, and the distance to each of the stations. The location service can ascertain this through the use of Primary and Secondary World structures as well as IDs that are associated with each of the Texaco stations, as described above in detail. It will be appreciated that the information that is provided to the user is different from and, in some cases independent of known navigation information (i.e. street maps and directional information and the like). The information that is provided to the users can be associated with one or more user-specified preferences. For example, the user might have specified that they only like to eat at Denny's, Stuckeys, and McDonald's while on the road. Accordingly, once the location service determines the location of the user's vehicle, the user can be advised of the nearest Denny's, Stuckeys, and McDonald's.

FIG. 20 is a flow diagram that describes steps in a method in accordance with one described embodiment. The method can be implemented in any suitable hardware, software, firmware, or combination thereof. In the described embodiment, the method is implemented in software.

Step 2000 determines a vehicle location. Location can be determined as described above. Step 2002 provides location-specific information for the user or driver of the vehicle. This information can be provided in any suitable way. In one particularly useful implementation, the location-specific information can be provided via a display that the user can view. The location-specific information can be information that is generally provided to all drivers (i.e. upcoming viewpoints, rest stops etc.). Alternately, the information can be user-specific and can be based on user-provided preferences.

User as a Context

In one embodiment, one context of a vehicle comprises the user or driver, as was mentioned above. That is, each user or driver is presumed to have preferences that are associated with a user-specific experience that they desire when they use the vehicle. For example, one user might have desired seat settings, while another driver might have different seat settings. When the context is location, different drivers might have different preferences that indicate where they desire to eat, points of interest, radio station types, and the like.

Consider the case when the vehicle is a rental car. In this instance, the vehicle is subject to use by a large number of users. Each user most assuredly will have different preferences that govern their user experience.

Figure 21:
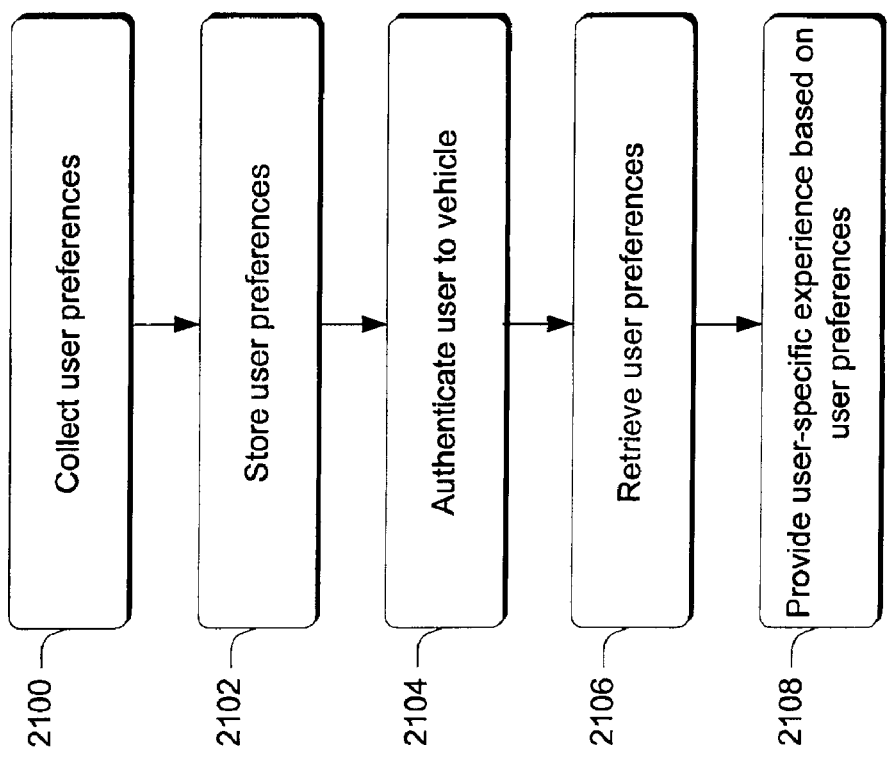
FIG. 21 is a flow diagram that describes steps in a method in accordance with one described embodiment.

FIG. 21 is a flow diagram that describes steps in a method in accordance with one described embodiment. The method can be implemented in any suitable hardware, software, firmware, or combination thereof. In the described embodiment, the method is implemented in software.

In accordance with one embodiment, user preferences are collected (step 2100) and stored (step 2102) or otherwise maintained in a vehicle-accessible location. For example, if the vehicle is a family car, the preferences of family drivers might be stored in a locally maintained store. If the vehicle is a rental car, the preferences might be stored in a large preference store remote from the vehicle. One example of a remote store is one that is accessible via the Internet through, for example, a Web server. For example, FIG. 22 shows a system generally at 2200 that comprises multiple vehicles 2202. Each vehicle is equipped with a vehicle computer 2204 such as that described above. A central server 2206 is accessible via the Internet and has access to a data store 2208 in which user preferences are stored. Each vehicle's computer can wirelessly access the Internet, as described above, so that the computer can gain access to various user preferences.

In this embodiment, a user of the vehicle first authenticates or identifies themselves to the vehicle (step 2104) at which point their preferences are retrieved (step 2106). As noted above, the preferences can be retrieved from a local storage location, or from a remote storage location. A user can authenticate themselves in any suitable way. For example, a password might be used. Alternately, an authentication service like Microsoft's Passport service might be used which authenticates the user via the Internet. Further, alternately, authentication can be implemented through fingerprinting techniques, voice recognition, or any other suitable biometrics techniques. Consider also the following example. A user is a rental car customer and is issued a "Preferred" card. This preferred card uniquely identifies the user. When the user rents a car, the attendant at the rental car counter swipes their card through a card reader which identifies the customer. Based on the customer's identity, a computer retrieves the customer's preferences from a store and communicates the preferences to a car that is waiting for the customer.

Once the user is authenticated and the user's preferences are retrieved, the behavior engine (1418 or 1618) causes applications executing on the vehicle's computer and which are associated with the subject of the user's preference, to provide a user-specific experience (step 2108). This user-specific experience can involve everything from adjusting the seat settings, to automatically mapping radio station types to radio buttons, to providing location-specific information that may likely be of interest to the user. In the rental car example above, when the customer arrives at their car, their preferences have already been implemented and a user-friendly car is waiting.

Accordingly, by maintaining or having access to user-specified preferences, the user's vehicle experience can be automatically tailored to a user's likes, while avoiding a user's dislikes. User convenience is enhanced in that once their preferences are established, they need not worry about configuring a vehicle to suit their preferences. This can all be done automatically for them.

Conclusion

The embodiments described above provide a uniform, standardized way to enhance the world of context aware computing. The embodiments provide a way for individuals to uniquely experience the world around them by ascertaining their location in the world in a standard way. The embodiments also provide a way for service providers to uniquely position their goods and services in a manner that is sensitive to and appreciates the contexts, e.g. locations, of various consumers of the goods and services. Unique and useful architectures and data structures are employed to facilitate the user's computing experience and provide for an individual-centric experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A location-aware system comprising:
   a radio having radio station buttons for selecting a radio station;
   a computer operably associated with the radio and configured to be mounted in a vehicle, the computer comprising one or more processors and computer-readable media associated with the one or more processors;

a first hierarchical tree structure resident on the computer-readable media and having multiple nodes associated with first locations;

at least one second hierarchical tree structure resident on the computer-readable media and having multiple nodes associated with second locations, at least one node from the at least one second hierarchical tree structure being linked with one node on the first hierarchical tree structure by a link that is configured to enable a complete location to be derived from the first and second locations;

one or more applications resident on the computer-readable media and configured to be executed on the one or more processors, one application being configured to map individual radio stations to specific radio station buttons;

one or more location providers operably associated with the computer and configured to provide location information for use in determining a vehicle location;

a location service module configured to receive location information from the one or more location providers and determine a vehicle location, the location service module being configured to determine a vehicle location by accessing multiple hierarchical tree structures and traversing at least one of each of said multiple hierarchical tree structures; and a behavior engine operably associated with the computer and configured to, responsive to a vehicle location that is determined by the location service module, cause said one application to map radio stations that are associated with a determined location to individual radio station buttons.

2. The location-aware system of claim 1, further comprising a data store communicatively linked with the computer and configured to hold user preferences that associate radio stations with various locations.

3. The location-aware system of claim 1, further comprising a data store remote from a vehicle in which the computer is mounted and communicatively linked with the computer and configured to hold user preferences that associate radio stations with various locations.

* * * * *